United States Patent
Park et al.

(10) Patent No.: US 10,222,537 B2
(45) Date of Patent: Mar. 5, 2019

(54) DISPLAY DEVICE WITH EDGE LIGHT GUIDE

(71) Applicant: SAMSUNG DISPLAY CO., LTD., Yongin-si, Gyeonggi-do (KR)

(72) Inventors: Young-min Park, Hwaseong-si (KR); Kwang-wook Choi, Cheonan-si (KR); Eunju Nam, Seoul (KR); Min-young Song, Asan-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 55 days.

(21) Appl. No.: 15/370,531

(22) Filed: Dec. 6, 2016

(65) Prior Publication Data

US 2017/0322361 A1 Nov. 9, 2017

(30) Foreign Application Priority Data

May 4, 2016 (KR) .................. 10-2016-0055589

(51) Int. Cl.
*F21V 8/00* (2006.01)
*G02F 1/1333* (2006.01)
(Continued)

(52) U.S. Cl.
CPC .............. *G02B 6/0051* (2013.01); *G02B 6/00* (2013.01); *G02B 6/003* (2013.01); *G02B 6/005* (2013.01); *G02B 6/0043* (2013.01); *G02B 6/0053* (2013.01); *G02B 6/0061* (2013.01); *G02B 6/0075* (2013.01); *G02B 6/0078* (2013.01); *G02B 6/0088* (2013.01); *G02F 1/133308* (2013.01); *G02F 1/133603* (2013.01); *G02F 1/133605* (2013.01); *G02F 1/133606* (2013.01);
(Continued)

(58) Field of Classification Search
CPC ......... G02F 1/133603; G02F 1/133604; G02F 1/133608; G02B 6/0073; G02B 6/0075; G02B 6/008; G02B 6/0051; G02B 6/0078
See application file for complete search history.

(56) References Cited

U.S. PATENT DOCUMENTS 5,995,288 A * 11/1999 Kashima ................ G02B 5/021
359/599
2003/0202359 A1* 10/2003 Albou ..................... F21V 7/08
362/514
(Continued)

FOREIGN PATENT DOCUMENTS

KR 10-2007-0040012 A 4/2007
KR 10-2012-0043600 A 5/2012
(Continued)

*Primary Examiner* — Anh T Mai
*Assistant Examiner* — Steven Y Horikoshi
(74) *Attorney, Agent, or Firm* — Lee & Morse P.C.

(57) ABSTRACT

A display device includes a display panel including a display area and a non-display area adjacent to the display area, a bottom member including a bottom part facing the display area, a side part extending from the bottom part toward the display panel, and a support part extending from the side part to face a portion of the display area and the non-display area, a plurality of light sources on the bottom part to emit light, and a light guide member between the support part of the bottom member and the display panel to guide the light incident from the plurality of light sources toward the display panel.

40 Claims, 18 Drawing Sheets

(51) Int. Cl.
*G02F 1/1335* (2006.01)
*G02B 6/00* (2006.01)

(52) U.S. Cl.
CPC .. *G02F 1/133608* (2013.01); *G02F 1/133611* (2013.01); *G02F 2001/13332* (2013.01); *G02F 2001/133314* (2013.01); *G02F 2001/133331* (2013.01); *G02F 2001/133388* (2013.01); *G02F 2001/133607* (2013.01); *G02F 2201/503* (2013.01)

(56) References Cited

U.S. PATENT DOCUMENTS

| | | | | |
|---|---|---|---|---|
| 2004/0130912 A1* | 7/2004 | Miyashita | ............. | G02B 6/002 362/561 |
| 2006/0133112 A1* | 6/2006 | Liao | ............. | G02B 6/0043 362/624 |
| 2007/0081110 A1* | 4/2007 | Lee | ............. | G02B 6/0053 349/61 |
| 2009/0303410 A1* | 12/2009 | Murata | ............. | G02B 6/002 349/58 |
| 2010/0110337 A1* | 5/2010 | Shin | ............. | G02F 1/133603 349/64 |
| 2011/0019126 A1* | 1/2011 | Choi | ............. | G02F 1/133603 349/61 |
| 2011/0157491 A1* | 6/2011 | Shimizu | ............. | G02B 6/0046 348/790 |
| 2012/0188465 A1* | 7/2012 | Ohyama | ............. | G02B 6/0036 348/739 |
| 2013/0094242 A1* | 4/2013 | Yang | ............. | G02F 1/1336 362/602 |
| 2013/0100697 A1* | 4/2013 | Yu | ............. | G02F 1/1336 362/608 |
| 2014/0098563 A1* | 4/2014 | Kim | ............. | G02B 6/0076 362/606 |
| 2015/0016090 A1 | 1/2015 | Lee et al. | | |
| 2015/0131315 A1 | 5/2015 | Chang | | |
| 2016/0123554 A1* | 5/2016 | Kang | ............. | G02F 1/133606 362/97.1 |

FOREIGN PATENT DOCUMENTS

| | | |
|---|---|---|
| KR | 10-2012-0065756 A | 6/2012 |
| KR | 10-2015-0030903 A | 3/2015 |
| KR | 10-2014-0109680 A | 6/2015 |

* cited by examiner

DISPLAY DEVICE WITH EDGE LIGHT GUIDE

CROSS-REFERENCE TO RELATED APPLICATION

Korean Patent Application No. 10-2016-0055589, filed on May 4, 2016, in the Korean Intellectual Property Office, and entitled: "Display Device," is incorporated by reference herein in its entirety.

BACKGROUND

1. Field

The present disclosure herein relates to a display device, and more particularly, to a display device including a direct-type backlight unit and a light guide member.

2. Description of the Related Art

Since a non-light producing display device, e.g., a liquid crystal display device, has a display panel for displaying an image, which itself does not produce light, a backlight unit for providing light to the display panel is provided. The backlight unit may be classified into a direct-type backlight unit and an edge-type backlight unit. The direct-type backlight unit includes a plurality of light sources disposed below the display panel. The edge-type backlight unit includes a light guide member disposed below the display panel and a plurality of light sources providing light to one side of the light guide member.

SUMMARY

The present disclosure provides a display device having a minimized-thickness bezel part that defines a non-display area.

An embodiment provides a display device including a display panel, a bottom member, a plurality of light sources, and a light guide member. The display panel includes a display area and a non-display area disposed adjacent to the display area. The bottom member includes a bottom part facing the display area, a side part extending from the bottom part toward the display panel, and a support past extending from the side part to face a portion of the display area and the non-display area. The plurality of light sources are disposed on the bottom part to emit light. The light guide member is disposed between the support part and the display panel to guide the light incident from the plurality of light sources toward the display panel.

In an embodiment, the light guide member may have an area equal to or less than that of the support part on a plane parallel to the display panel. The light guide member may overlap the portion of the display area and may not overlap the non-display area.

In an embodiment, the display device may further include a diffusion plate. The diffusion plate may be disposed on the bottom member to overlap the bottom part, the side part, and the support part.

In an embodiment, the display device may further include the transparent adhesion member disposed between the light guide member and the diffusion plate. The transparent adhesion member may include an optically clear adhesive (OCA) or an optically clear resin (OCR).

In an embodiment, the display device may further include an optical member disposed on the diffusion plate to overlap the display area.

In an embodiment, the optical member may include a first prism member, a second prism member, and a diffuser. The first prism member may be disposed on the diffusion plate to adjust directivity of the incident light in a first direction. The second prism member may be disposed on the first prism member to adjust the directivity of the incident light in a second direction perpendicular to the first direction. The diffuser may be disposed on the second prism member to diffuse the incident light.

In an embodiment, the display area may include a first display area overlapping the bottom part and the side part and a second display area overlapping the support part. The optical member may include a first diffuser, a first prism member, a second prism member, and a second diffuser. The first diffuser may overlap the second display area and be disposed on the diffusion plate to diffuse the incident light. The first prism member may overlap the first display area and the second display area and be disposed on the first diffuser to adjust the directivity of the incident light in a first direction. The second prism member may overlap the first display area and the second display area and be disposed on the first prism member to adjust the directivity of the incident light in a second direction perpendicular to the first direction. The second diffuser may overlap the first display area and be disposed on the second prism member to diffuse the incident light.

In an embodiment, the display device may further include a brightness enhancement member overlapping the second display area and disposed on the second prism member so enhance brightness of the incident light.

In an embodiment the light guide member may include an emission pattern configured to scatter the incident light.

In an embodiment the emission pattern may include: a first pattern area in which a plurality of furrows are arranged with a first density; and a second pattern area in which a plurality of furrows are arranged with a second density greater than the first density. The first density may be equal to or greater than about 1,600 units/cm$^2$ and less than about 30,000 units/cm$^2$, and the second density may be equal to or greater than about 30,000 units/cm$^2$ and equal to or less than about 62,500 units/cm$^2$. The first pattern area and the second pattern area may be alternately arranged.

In an embodiment, each of the plurality of light sources may include: an LED chip configured to generate light; and a lens configured to cover the LED chip and totally reflect the light toward the side part. Each of the plurality of light sources may be spaced at least 50 mm from the side part.

In an embodiment, the light guide member may include a first light guide surface disposed adjacent to the bottom member and a second light guide surface disposed adjacent to the diffusion plate. An incident angle of the incident light with respect to the second light guide surface may be equal to or greater than about 42° and less than about 90°.

In an embodiment, the display device may further include a plurality of sub-guide members. The plurality of sub-guide members may be disposed on the light guide member to adjust a directivity of the light. Each of the plurality of sub-guide members may have a cross-section gradually increasing in width in a direction that is away from the light guide member.

In an embodiment, the bottom part may include: a first edge; a second edge extending from the first edge in a direction perpendicular to the first edge; a third edge extending from the second edge and parallel to the first edge; and a fourth edge extending from the third edge and parallel to the second edge. The side part may include: a first side surface extending from the first edge; a second side surface extending from the second edge; a third side surface extending from the third edge; and a fourth side surface extending from the fourth edge. The support part may include: a first support surface extending from the first side surface; a second support surface extending from the second side surface; a third support surface extending from the third side surface; and a fourth support surface extending front the fourth side surface.

In an embodiment, the light guide member may be disposed to overlap the first support surface.

In an embodiment, the light guide member may be provided in pair. One of the pair of light guide members may be disposed to overlap the first support surface and the other may be disposed to overlap the third support surface.

In an embodiment, the light guide member may include: a first light guide member disposed on the first support surface; a second light guide member disposed on the second support surface; a third light guide member disposed on the third support surface; and a fourth light guide member disposed on the fourth support surface.

In an embodiment, the display device may further include a reflective member contacting the bottom member.

In an embodiment, a display device includes a display panel, a bottom member, a plurality of light sources, and a light guide member. The display panel includes a display area and a non-display area disposed adjacent to the display area. The bottom member includes a bottom surface facing the display panel a side surface extending toward the display panel, and a support surface extending from the side surface. The plurality of light sources are disposed on the bottom surface to emit light. The light guide member is disposed to overlap the support surface and receiving light to guide the light toward the display panel.

In an embodiment, a display device includes a display panel, a plurality of light sources, and a light guide member. The display panel includes a central display area and an edge display area disposed adjacent to the central display area. The plurality of light sources overlap the central display area and are disposed below the display panel to emit light. The light guide member overlaps the edge display area, does not overlap the central display area, and is disposed below the display panel to guide the light incident from the plurality of light sources toward the display panel.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
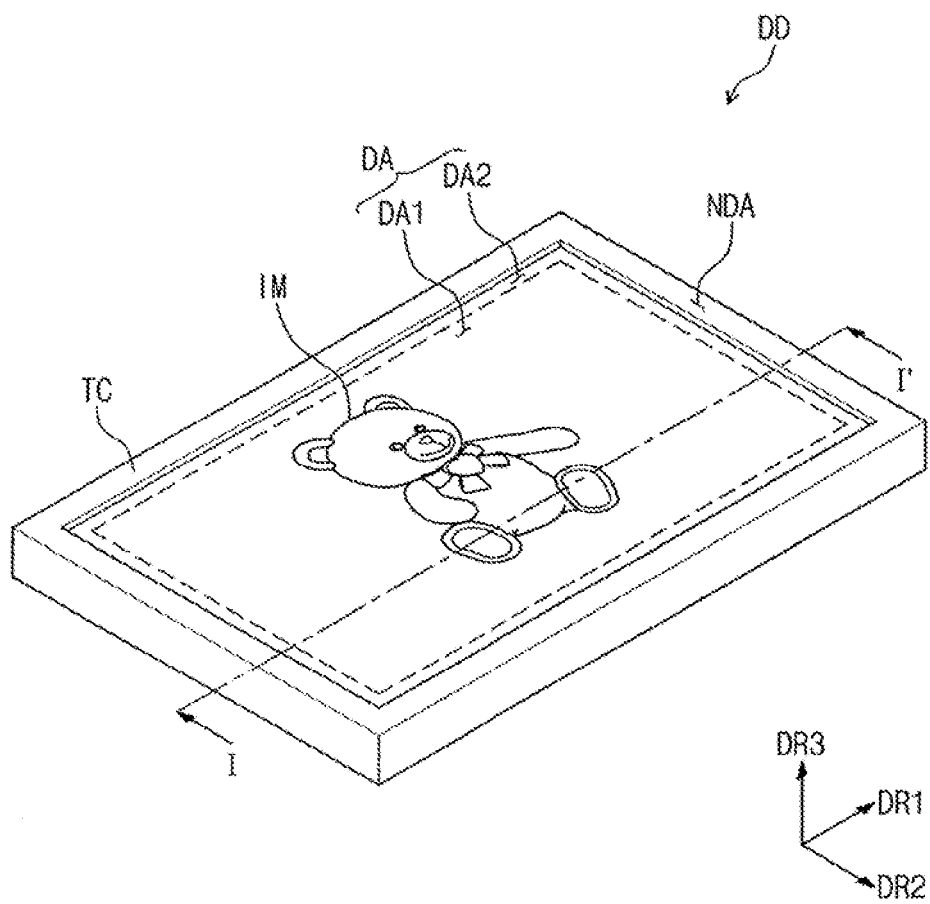
FIG. 1 illustrates a perspective view of a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
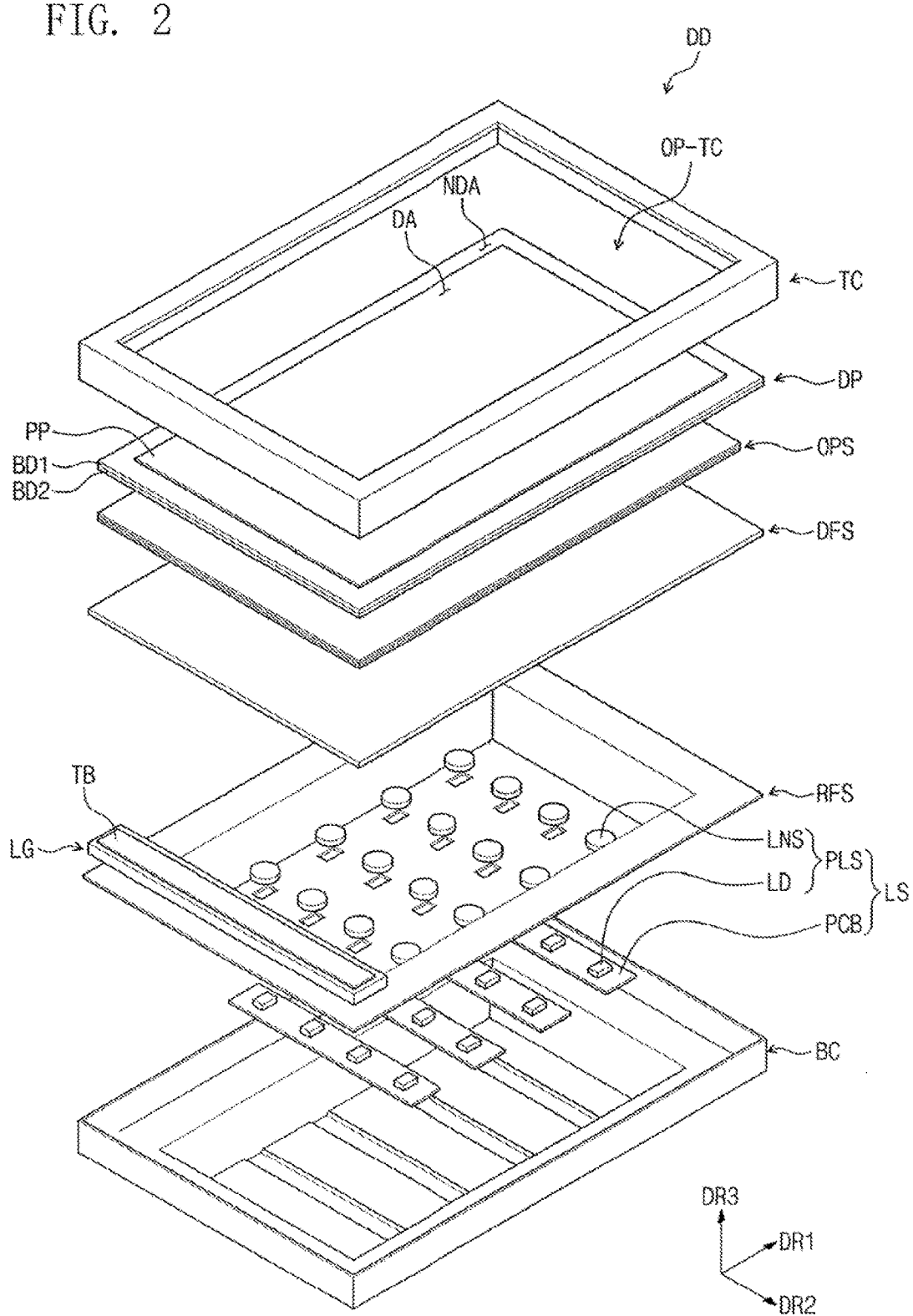
FIG. 2 illustrates an exploded perspective view of the display device in FIG. 1.

FIG. 1 is a perspective view of a display device DD according to an embodiment. FIG. 2 is an exploded perspective view of the display device DD.

As illustrated in FIGS. 1 and 2, the display device DD may include a top cover TC, a display panel DP, an optical member OPS, a diffusion plate DFS, a light guide member LG, a reflective member RFS, a light source LS, and a bottom member BC. The display device DD may further include a bottom cover below the bottom member BC to protect the display device DD from external shock or pollutants.

As illustrated in FIG. 1, the display device DD includes a display area DA and a non-display area NDA. The display area DA is provided on a plane parallel to a plane defined by a first direction DR1 and a second direction DR2 perpendicular to the first direction DR1 on a display panel DP. The non-display area NDA may be external to the display area DA, e.g., the non-display area NDA may surround an entire perimeter of the display area DA. The non-display area NDA may be defined by the top cover TC. In case of the display device DD without the top cover TC, the non-display area NDA may be defined by a sealing member or a mold.

The display area DA includes a first display area DA1 and a second display area DA2. The first display area DA1 is defined as a central portion of the display area DA. The second display area DA2 is disposed adjacent to the first display area DA1 and defined as a side portion of the display area DA. That is, the first display area DA1 is a central display area, and the second display area DA2 is an edge display area, e.g., the second display area DA2 may surround an entire perimeter of the first display area DA. The display area DA provides an image IM to a consumer. As an example of the image IM, a teddy bear is illustrated in FIG. 1.

The top cover TC may protect the display panel DP, the light guide member LG, the light source LS, the diffusion plate DFS, and the optical member OPS from external shock or pollutants. An opening OP-TC of the top cover TC may expose a front surface of the display panel DP to define the display area DA. Hereinafter, the top cover TC will not be illustrated for convenience of description.

The display panel DP may be disposed below the top cover TC in a third direction DR3. The display panel DP displays an image. The display panel DP according to an embodiment is not especially limited. For example, the display panel DP may include a non-light emitting display panel that needs a separate light source, i.e., a transflective or transmissive display panel. Hereinafter, the display panel DP will be described as a liquid crystal display panel.

The display panel DP may include a first substrate BD1, a second substrate 120 facing the first substrate BD1, and a liquid crystal layer disposed therebetween. The liquid crystal layer may include a plurality of liquid crystal molecules changing their orientation states according to an electric field formed between the first substrate BD1 and the second substrate BD2. A pair of polarizing plates PP may be disposed above and below the display panel DP. Although the display panel DP is exemplarily illustrated as a plane, e.g., flat structure, in FIG. 1, an embodiment is not limited thereto. For example, the display panel DP according to another embodiment may be curved at a predetermined curvature.

The optical member OPS may be disposed below the display panel DP in the third direction DR3. The optical member OPS may include at least one of a diffuses, a first prism sheet (or horizontal prism sheet), a second prism sheet (or vertical prism sheet), or a brightness enhancement member. However, the optical member OPS is not limited-thereto, e.g., the optical sheet OPS may include a sheet for varying or enhancing a characteristic of incident light.

The diffusion plate DFS may be disposed below the optical member OPS in the third direction DR3. The diffusion plate DFS diffuses light incident from the light source LS toward the display panel DP. Accordingly, the light emitted from the light source LS may have improved uniformity.

The light guide member LG guides the light emitted from the light source LS toward the display panel DP. The light guide member LG may be one of a light guide plate or a light guide film. According to characteristics of the display device DD, a material or shape of the light guide member LG may change. The light guide member LG may be attached to the reflective member RFS or the bottom member BC.

The light source LS is disposed below the display panel DP to provide light to the display panel DP. The light source LS includes a plurality of point light sources PLS and a printed circuit board PCB. Each of the point light sources PLS may include an LED chip LD or a lens LNS. The LED chip LD may be mounted on the printed circuit board PC and emit light of about 430 nm to about 780 nm, which is in a visible ray area. The lens LNS may control a traveling direction of the light emitted from the LED chip LD.

The reflective member RFS may be disposed between the lenses LNS and the printed circuit board PCB. The reflective member RFS reflects the light that is generated from the LED chips LD and then emitted from the lenses LNS. According to an embodiment, the reflective member RFS may have a sheet shape having a thickness of several μm to several hundred μm. According to another embodiment, the reflective member RFS may have a shape coated on a bottom member BC.

A plurality of optical member supporters may be disposed on the reflective member RFS. The optical member supporters may support the diffusion plate DFS or the optical member OPS.

Figure 3:
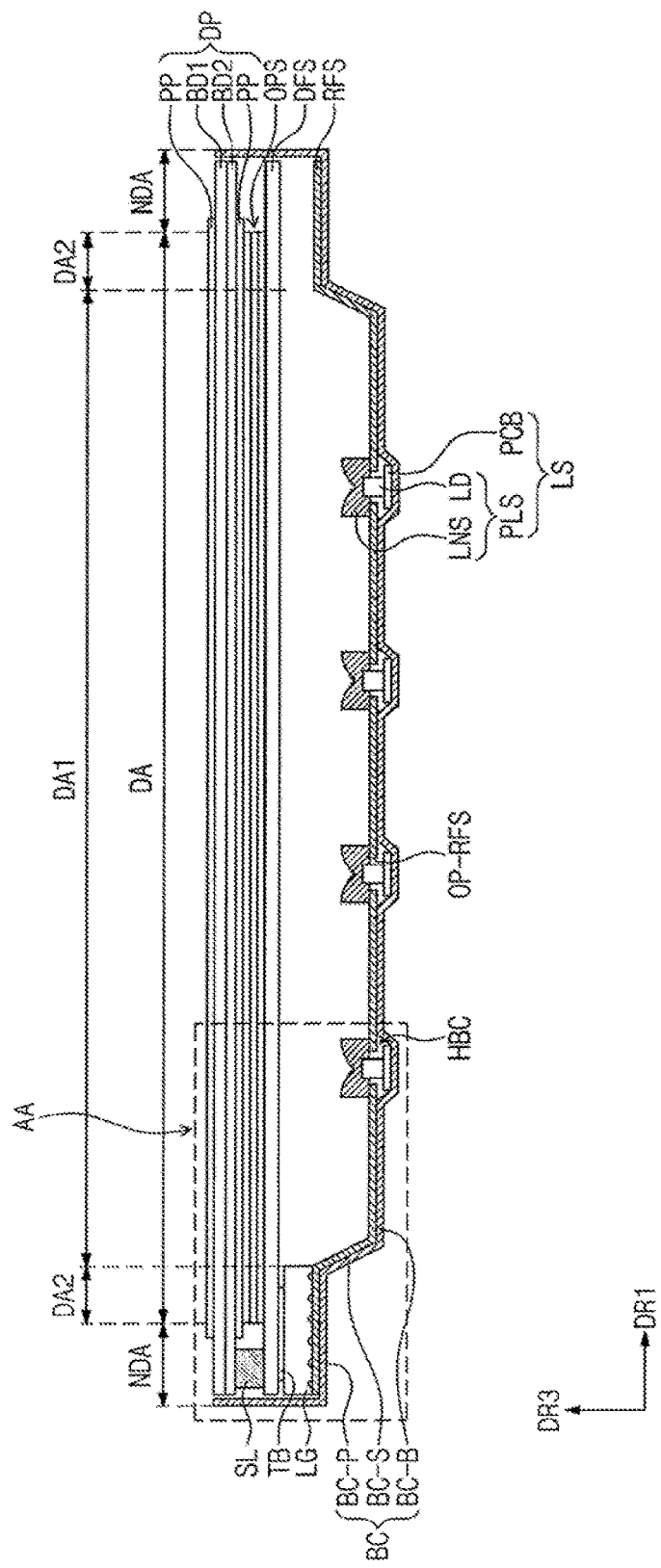
FIG. 3 illustrates a cross-sectional view taken along line I-I' of FIG. 1.
Figure 4:
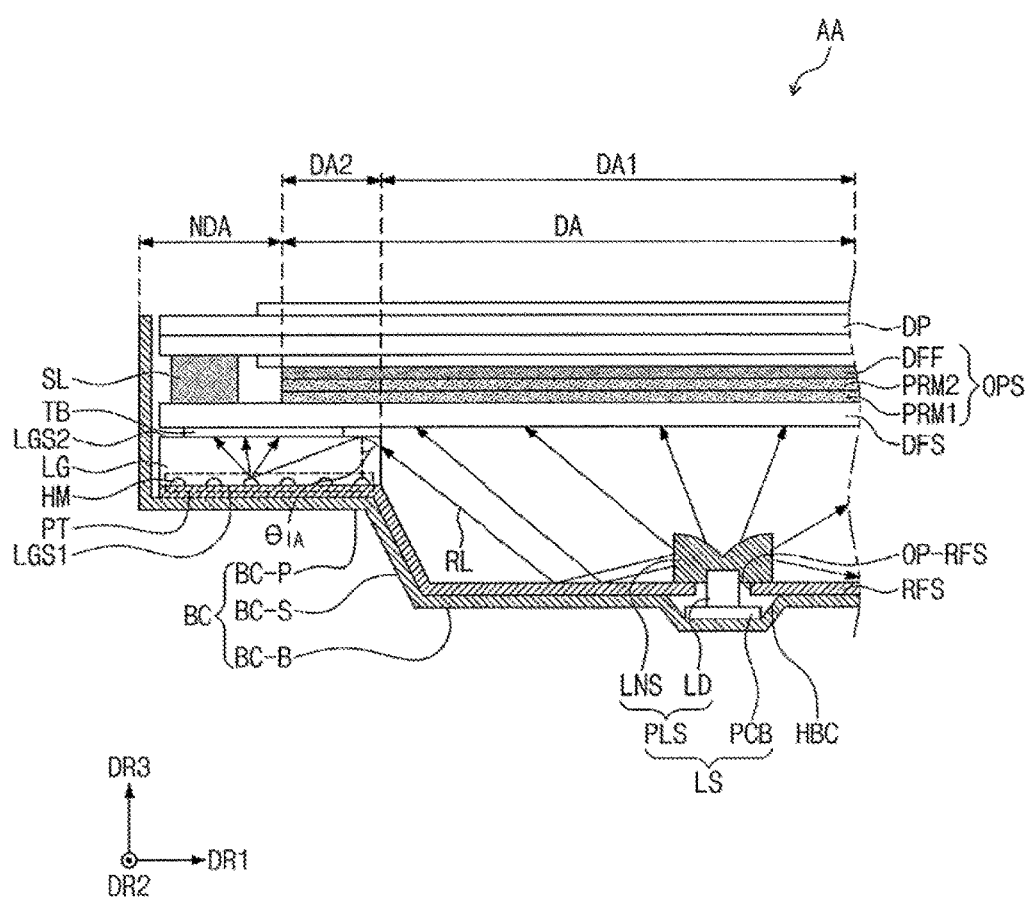
FIG. 4 illustrates an enlarged view of a portion AA of FIG. 3.

FIG. 3 is a cross-sectional view taken along line I-I' of FIG. 1. FIG. 4 is an enlarged view of a portion AA of FIG. 3. The top cover TC is not illustrated in FIG. 3 for convenience of description.

Referring to FIGS. 3-4, the bottom member BC may accommodate the light guide member LG, the diffusion plate DFS, the optical member OPS, and the display panel DP. The bottom member BC includes a bottom part BC-B, a side part BC-S, and a support past BC-P. In the third direction DR3, the bottom part BC-B and the side part BC-S overlap the first display area DA1, and the support part BC-P overlaps the second display area DA2 and the non-display area NDA.

The bottom part BC-B may include substrate support parts HBC for supporting the printed circuit board PCB. Each of the substrate support parts HBC may have a furrow shape for easily supporting the corresponding printed circuit board PCB. However, the shape of each of the substrate support parts HBC is not limited thereto, e.g., each of the substrate support parts HBC may have a flat shape.

The side part BC-S extends from the bottom part BC-B toward the display panel DP. In the third direction DR3, the side part BC-S has a height enabling the lens LNS not to contact tire diffusion plate DFS. However, an embodiment is not limited thereto. For example, the side part BC-S may not exist as necessary, e.g., a spaced-distance between the lens LNS and the diffusion plate DFS may be secured by another component.

The support part BC-P extends from the side part BG-S. The support part BC-P may support the light guide member LG, the diffusion plate DFS disposed on the light guide member LG, the optical member OPS, and the like.

The reflective member RFS is disposed on the bottom member BC in the third direction DR3. A plurality of openings OP-RFS are defined in the reflective member RFS. The corresponding LED chip LD is inserted into each of the openings OP-RFS.

A path of light RL generated from the LED chip LD is changed by the lens LNS. The reflective member RFS reflects the light RL transmitted through the lens LNS. The light RL generated from the light source LS is emitted toward the diffusion plate DFS or the light guide member LG.

The light guide member LG is disposed on the support part BC-P in the third direction DR3. The light guide member LG is disposed to overlap the support part BC-P, e.g., the light guide member LG may overlap only the support part BC-P of the bottom member BC among all parts of the bottom member BC. The light guide member LG guides the light incident from the light source LS toward the display panel DP. The light guide member LG has an area equal to or less than that of the support part BC-P on a plane parallel to a plane defined by the first direction DR1 and the second direction DR2. When the area of the light guide member LG is equal to or less than that of the support part BC-P, the support part BC-P may firmly support the light guide member LG.

Referring to FIG. 4, the light guide member LG include a first light guide surface LGS1 and a second guide surface LGS2. The first light guide surface LGS1 is a surface disposed adjacent to, e.g., facing, a support part BC-P, and the second light guide surface LGS2 is a surface disposed adjacent to, e.g., facing, the diffusion plate DFS. The first light guide surface LGS1 may contact the reflective member RFS. However, an embodiment is not limited thereto, e.g., the first light guide surface LGS1 may directly contact the support part BC-P.

The light RL incident onto the second light guide surface LGS2 may be totally reflected, e.g., due to the difference between reflective indexes of the light guide member LG and external materials of the light guide member LG. The light RL incident onto the second light guide surface LGS2 has an incident angle $\theta_{IA}$ that is equal to or greater than, e.g., about 42° and less than about 90°. Considering characteristics of a conventional light guide member LG, a condition of the total reflection is satisfied when the incident angle $\theta_{IA}$ is equal to or greater than about 42°.

The light guide member LG includes an emission pattern PT. The light RL totally reflected by the second light guide surface LGS2 is scattered by the emission pattern PT. The light scattered by the emission pattern PT is emitted toward the display panel DP.

The emission pattern PT may include a plurality of bumps HM, e.g., the bumps HM may have hemispherical shapes protruding from the first light guide surface LGS1 toward second light guide surface LGS2. The bumps HM substantially scatter the light RL totally reflected by the second light guide surface LGS2. The bumps HM may have a density that is adjusted to adjust brightness of the emitted light. For example, the brightness of the emitted light may be high when the density of the bumps HM per unit area is high, and the brightness of the emitted light may be low when the density of the bumps HM per unit area is low. For example, each of the bumps HM may have a diameter of about 30 μm to about 200 μm. The bumps HM may be spaced, e.g., about 40 μm to about 210 μm, from each other.

The emission pattern PT may be disposed adjacent to the first light guide surface LGS1, e.g., the emission pattern PT may be on the first light guide surface LGS1. However, an embodiment is not limited thereto, e.g., the emission pattern PT may be disposed on a different position while diffusing to guide the incident light RL toward the display panel DP.

The transparent adhesion member TB is disposed between the diffusion plate DFS and the light guide member LG to couple the diffusion plate DFS to the light guide member LG. For example, the transparent adhesion part TB may include an optical clear adhesive (OCA) or an optical clear resin (OCR). However, an embodiment is not limited thereto, e.g., the transparent adhesion part TB may be a transparent adhesion member transmitting the incident light. Since the transparent adhesion member TB transmits the incident light, the light scattered by the emission pattern PT may easily reach the display panel DP.

The diffusion plate DFS may be disposed on the transparent adhesion member TB in the third direction DR3. The diffusion plate DFS may overlap the bottom part BC-B, the side part BC-S, and the support part BC-P. The diffusion plate DFS receives the light directly emitted from the light source LS, the light emitted from the light source LS and then reflected by the reflective member RFS, and the light emitted from the light source LS and then guided by the light guide member LG.

The light source LS is spaced, e.g., by at least 50 mm, from the side part BC-S. This is because the light incident from the light source LS into the light guide member LG may not be totally reflected in the light guide member LG when the distance between the light source LS and the side part BC-S is less than about 50 mm.

The optical member OPS is disposed on the diffusion plate DFS in the third direction DR3. The optical member OPS overlaps the display area DA. The optical member OPS may include a first prism street PRM1, a second prism sheet PRM2, and a diffuser DFF. The first prism sheet PRM1 and the second prism sheet PRM2 collect the light diffused by the diffusion plate DFS toward the display panel DP.

In detail, the first prism sheet PRM1 may be disposed on the diffusion plate DFS in the third direction DR3. The first prism sheet PRM1 may adjust directivity of the incident light in the first direction DR1. For example, when the first prism sheet PRM1 is a horizontal prism sheet, the horizontal prism sheet may horizontally adjust the directivity of the incident light.

The second prism sheet PRM2 may be disposed on the first prism sheet PRM1. The second prism sheet PRM2 may adjust the directivity of the incident light in the second direction DR2 perpendicular to the first direction DR1. For example, when the second prism sheet PRM2 is a vertical prism sheet, the vertical prism sheet may vertically adjust the directivity of the incident light.

However, the arrangement relationship between the first prism sheet PRM1 and the second prism sheet PRM2 is not limited thereto. For example, the lamination structure between the first prism sheet PRM1 and the second prism sheet PRM2 may be changed.

The diffuser DFF may be disposed on the second prism sheet PRM2 in the third direction DR3. The diffuser DFF diffuses the incident light to provide the diffused light to the display panel DP. The diffuser DFF may have a sheet shape unlike the diffusion plate DFS. However, an embodiment is not limited thereto, e.g., each of the diffuser DFF and the diffusion plate DFS may have one of the plate shape or the sheet shape.

Each of the diffuser DFF and the diffusion plate DFS may include a transparent binder and a globular shaped bead. The binder may be made of one of, e.g., polyurethane, polyester, fluorine-based resin, silicon-based resin, polyamide, or an epoxy resin. The bead may be made of at least one of, e.g., an acrylic resin, polyurethane, polyvinyl chloride, polystyrene, polyacrylonitrile, or polyamide.

Since the binder and the bead transmit light, the binder and the bead are colorless and transparent. Here, the bead has a mean particle diameter equal to or greater than about 1 μm and equal to or less than about 50 μm. When the mean particle diameter is less than the above-described range, a satisfactory light diffusion function may not be performed. When the mean panicle diameter is greater than the showdescribed range, a resin composition constituting the diffuser may be difficult to be applied.

The display panel DP may be disposed on the optical member OPS in the third direction DR3. In the display panel DP, one area capable of providing image information by using the light passing through the optical member OPS corresponds to the display area DA, and the other area corresponds to the non-display area NDA.

The display panel DP may be coupled to the diffusion plate DFS by a sealing member SL. The sealing member SL blocks external oxygen or moisture front being introduced to prevent inner components from being corroded or damaged. However, the method for fixing the display panel DP is not limited thereto, e.g., the display panel DP may be fixed through a different method or structure.

As the light guide member LG is disposed to overlap only the support part BC-P among all parts of the bottom member BC, a mold part for seating and fixing the diffusion plate DFS or the like may be omitted. Accordingly, the non-display area NDA may be minimized in comparison with a conventional display device containing the edge type backlight unit or the direct type backlight unit. That is, according to an embodiment, the display device DD having a slim bezel and an elegant appearance may be provided.

Figure 5:
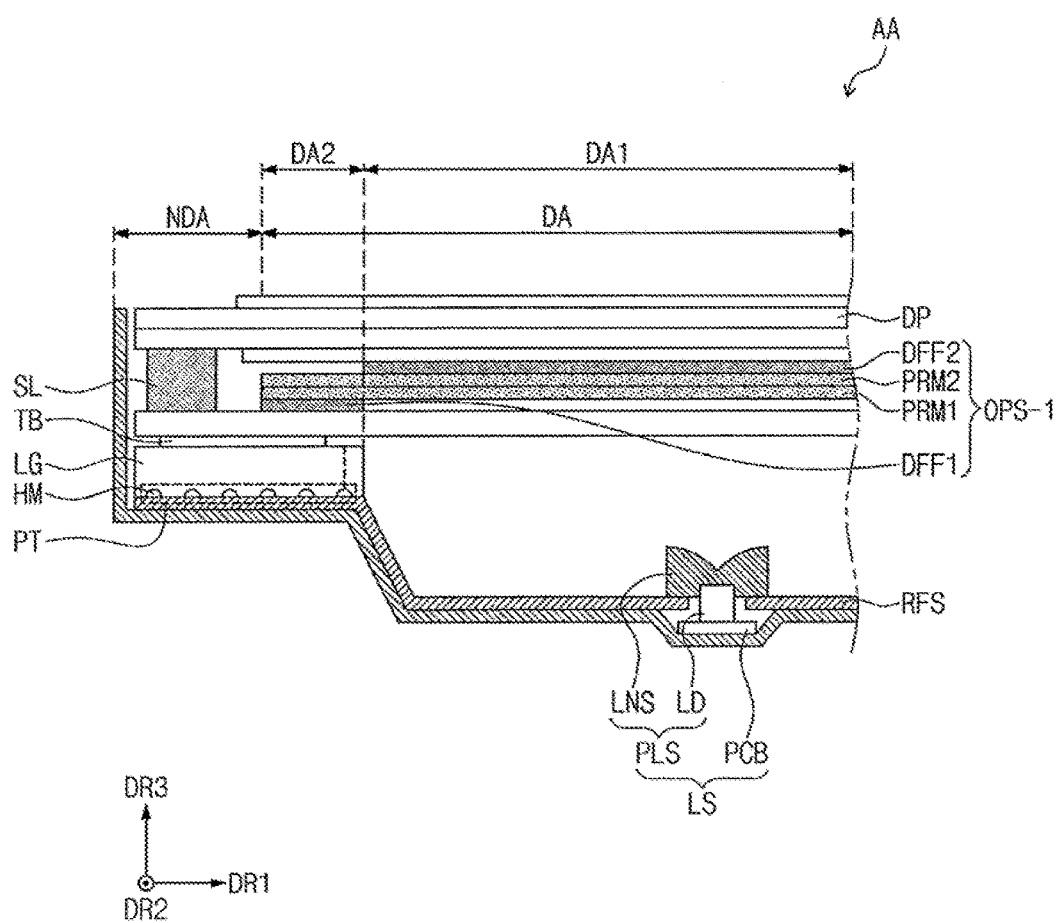
FIG. 5 illustrates a portion of a cross-section of the display device according to an embodiment.

FIG. 5 illustrates a portion of a cross-section of the display device according to an embodiment. Referring to FIG. 5, the optical member OPS-1 may include a first diffuser DFF1, a first prism sheet RPM1, a second prism sheet RPM2, and a second diffuser DFF2.

The first diffuser DFF1 is disposed on the diffusion plate DFS and overlaps the second display area DA2. The first diffuser DFF1 does not overlap the first display area DA1. When the first diffract DFF1 overlaps only the second display area DA2, a direction of light traveling from the light source LS toward the display panel DP without passing through the light guide member LG may be effectively controlled. The first prism sheet PRM1 is disposed on the first diffuser DFF1, and the second prism sheet PRM2 is disposed on the first prism sheet PRM1.

The second diffuser DFF2 is disposed on the second prism sheet PRM2 and overlaps the first display area DA1. The second diffuser DFF2 does not overlap the second display area DA2. When the second diffuser DFF2 overlaps only the first display area DA1, a direction of light traveling from the light source LS and passing through the light guide member LG toward the display panel DP may be effectively controlled. The second diffuser DFF2 is substantially the same as the first diffuser DFF1 except the disposed position.

Description regarding the rest components is substantially the same as the contents described in FIG. 4 and thus omitted.

The light passing through the light guide member LG and traveling toward the display panel DP and the light traveling toward the display pastel DP without passing through the light guide plate LG have different optical characteristics from each other. The optical characteristics may include, e.g., a traveling path and an incident angel of the light. Accordingly, when the light passing through the light guide member LG and traveling toward the display panel DP sequentially passes the first diffuser DFF1, the first prism sheet PRM1, and the second prism sheet PRM2, the display panel DP may have the optical characteristics suitable to generate image information. On the other hand, when the light traveling toward the display panel DP without passing through the light guide plate LG sequentially passes the first prism sheet PRM1, the second prism sheet PRM2, and the second diffuser DFF2, the display panel DP may have optical characteristics suitable to generate image information. As the above-described optical characteristics are considered with respect to the embodiment in FIG. 5, light having high uniformity of brightness may the provided to the display panel DP.

Figure 6A:
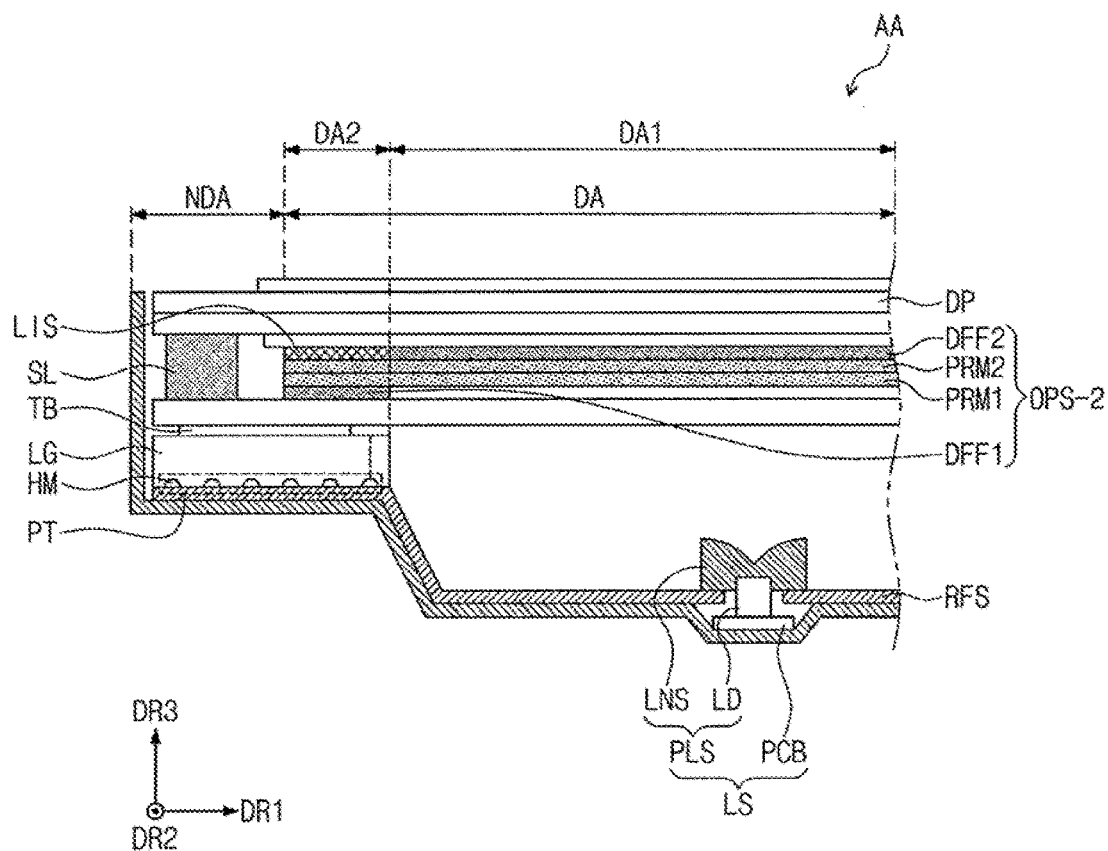
FIG. 6A illustrates a portion of the cross-section of the display device according to an embodiment.
Figure 6B:
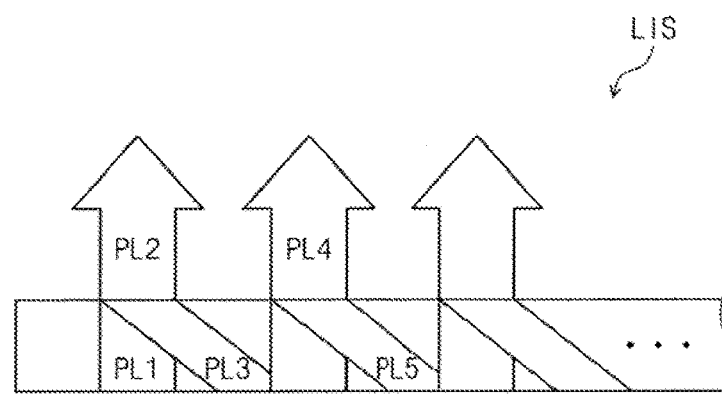
FIG. 6B illustrates an enlarged view of a brightness enhancement member of FIG. 6A.

FIG. 6A illustrates a portion of a cross-section of a display device according to an embodiment. FIG. 6B is an enlarged view of a brightness enhancement member LIS of FIG. 6A. Referring to FIGS. 6A and 6B, an optical member OPS-2 of the display device DD according to an embodiment may include the first diffuser DFF1, the first prism sheet RPM1, the second prism sheet RPM2, the second diffuser DFF2, and the brightness enhancement member LIS. Description regarding the first diffuser DFF1, the first prism sheet RPM1, the second prism sheet RPM2, and the second diffuser DFF2 is substantially the same as the contents described in FIG. 5 and thus omitted.

The brightness enhancement member LIS selectively transmits light having one polarization state and reflects light having another polarization state according to the polarization state of the light. The light reflected without passing through the brightness enhancement member LIS is re-reflected to travel upward again. The brightness enhancement member LIS continuously repeats transmission of light having a specific polarization state and then reflects the remaining light.

For example, first light PL1 incident into the brightness enhancement member LIS is divided into second light PL2 having one polarization state and third light PL3 having a different polarization state. The second light PL2 passes through the brightness enhancement member LIS, and the third light PL3 does not pass through the brightness enhancement member LIS and is reflected. When the third light PL3 is reflected, the third light PL3 is divided into fourth light PL4 having the same polarization state as that of the first light PL1 and a fifth light PL5 having the different polarization state. The fourth light PL4 passes through the brightness enhancement member LIS, and the fifth light PL5 does not pass through the brightness enhancement member LIS and is reflected. The brightness enhancement member LIS may repeat the above-described process to enhance the brightness of the incident light. As an example of the brightness enhancement member LIS, there is a dual brightness enhancement film (DBEF).

In FIG. 6A, in a structure below the diffusion plate DFS, there is a difference between a structure corresponding to an area overlapping the first display area DA1 and a structure corresponding to an area overlapping the second display area DA2. Due to the structural difference, the brightness of the light incident into the display panel DP in the portion overlapping the second display area DA2 of the diffusion plate DFS may be lower than that of the light incident into the display panel DP in the portion overlapping the first display area DA1 of the diffusion plate DFS.

However, according to embodiments, the brightness enhancement member LIS may adjust the difference in the brightness in the first and second display areas DA1 and DA2. That is, as the brightness enhancement member LIS is disposed to overlap the second display area DA2 on the second prism sheet PRM2, despite the different brightness intensity of the incident light in the portions overlapping the first display area DA1 and the second display area DA2, the brightness of the light incident into the display panel DP may be adjusted to remove the difference between the portion overlapping the first display area DA1 and the portion overlapping the second display area DA2. Description regarding the remaining components is the same as the contents described with reference to FIG. 5 and thus omitted.

Figure 7A:
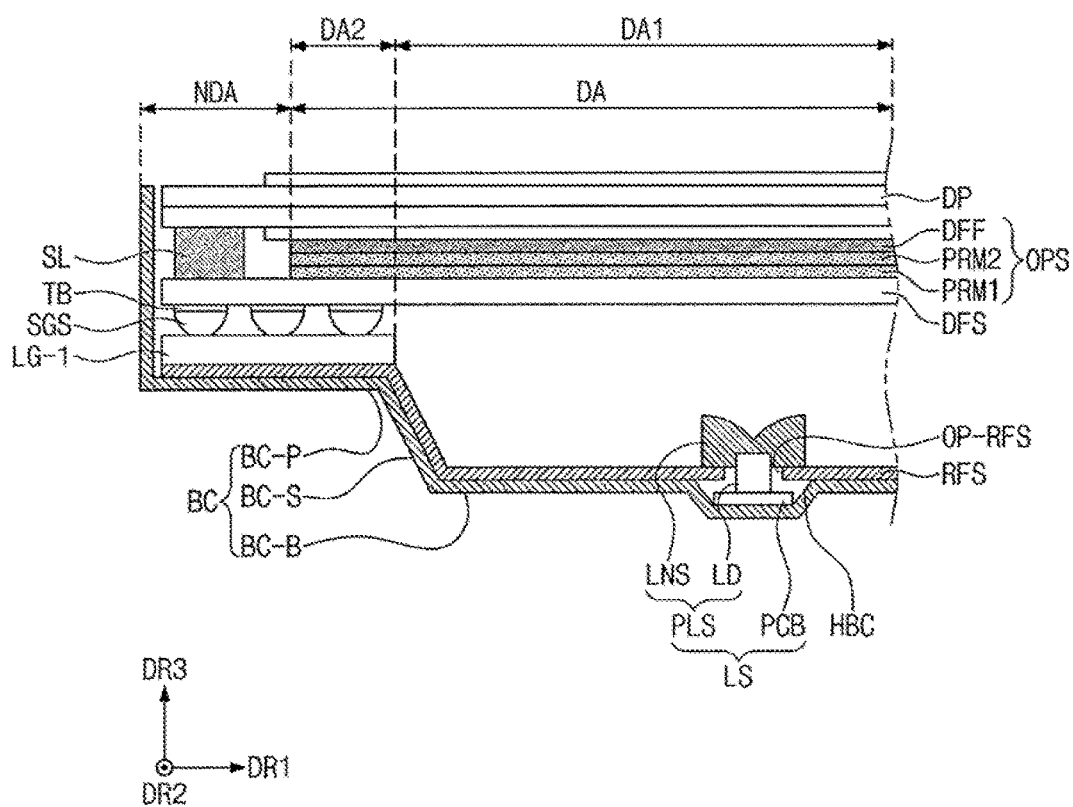
FIG. 7A illustrates a portion of the cross-section of the display device according to an embodiment.
Figure 7B:
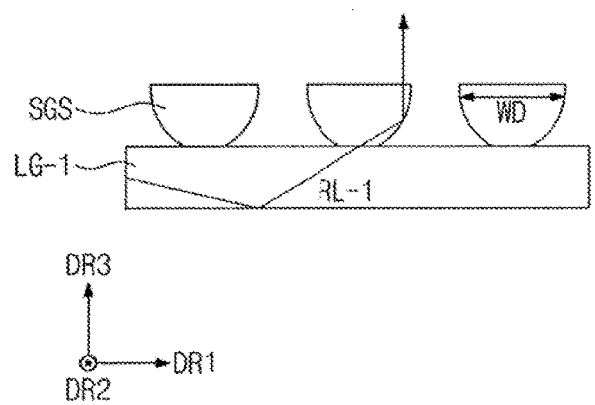
FIG. 7B illustrates an enlarged view of a light guide member and sub-guide members of FIG. 7A.

FIG. 7A illustrates a portion of a cross-section of the display device according to an embodiment. FIG. 7B is as enlarged view of a light guide member LG-1 and sub-guide members SGS.

Referring to FIGS. 7A and 7B, the display device DD according to an embodiment may include the light guide member LG-1 and the sub-guide members SGS.

The light guide member LG-1 may have a thin film shape. For example, the light guide member LG-1 may have a thickness of about 100 μm to about 500 μm. Accordingly, the light guide member LG-1 may have a flexible property. The light guide member LG-1 may include a polymer material, e.g., polyethylene terephthalate (PET), polymethyl methacrylate (PMMA), and poly carbonate (PC).

Referring to FIG. 7B, the sub-guide members SGS are spaced apart from each other on the light guide member LG-1. Each of the sub-guide members SGS has a width WD measured in the first direction DR1, which gradually increases as a distance from the light guide member LG-1 increases. Since the sub-guide members SGS have the above-described shape, the sub-guide members SGS may emit light RL-1 totally reflected in the light guide member LG-1 to the outside. Accordingly, although the light guide member LG-1 does not include a separate emission pattern PT (refer to FIG. 4), the light RL-1 incident into the light guide member LG-1 by the sub-guide members SGS travels toward the display panel DP.

Since the sub-guide members SGS emits the light RL-1 totally reflected in the light guide member LG-1 to the outside, as a density of each of the sub-guide members SGS disposed on the light guide member LG-1 increases, an amount of the light emitted from the light guide member LG-1 through the sub-guide members SGS may increase. Since the light guide member LG-1 in FIGS. 7A and 7B has a small thickness, the display device using the light guide member LG-1 may have a small thickness and a light weight. Description regarding the remaining components is the same as the contents described with reference to FIG. 3 and thus omitted.

Figure 8:
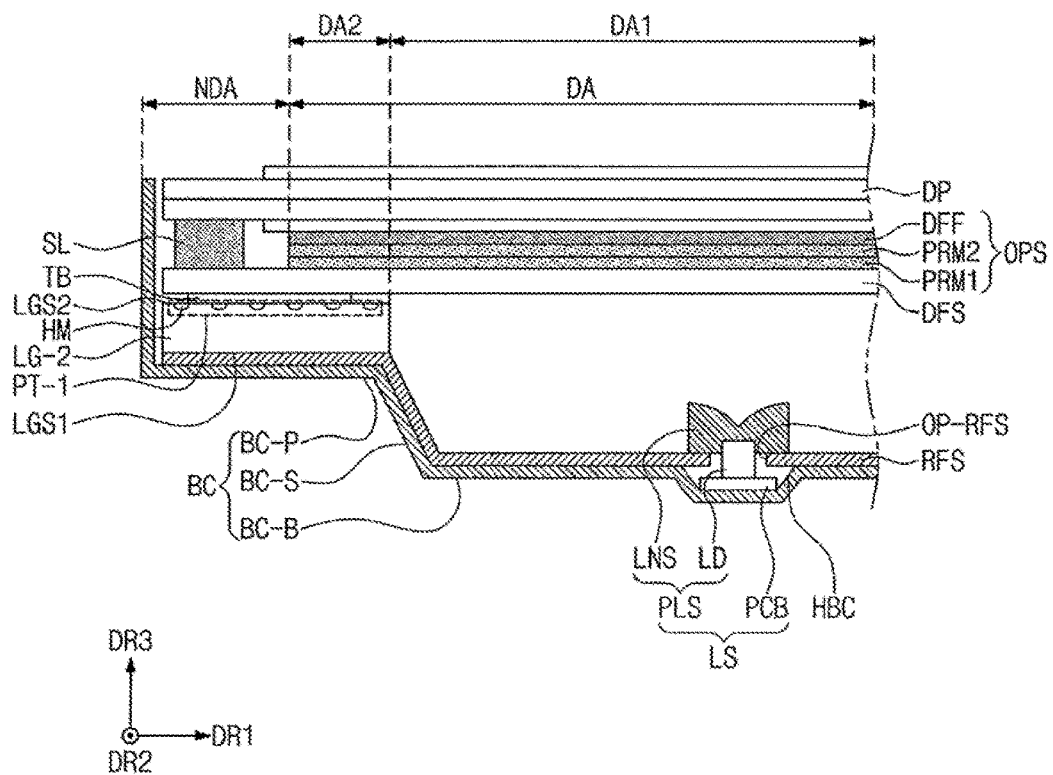
FIGS. 8, 9, and 10 illustrate modified examples at a portion of the cross-section of the display device according to an embodiment, respectively.
Figure 9:
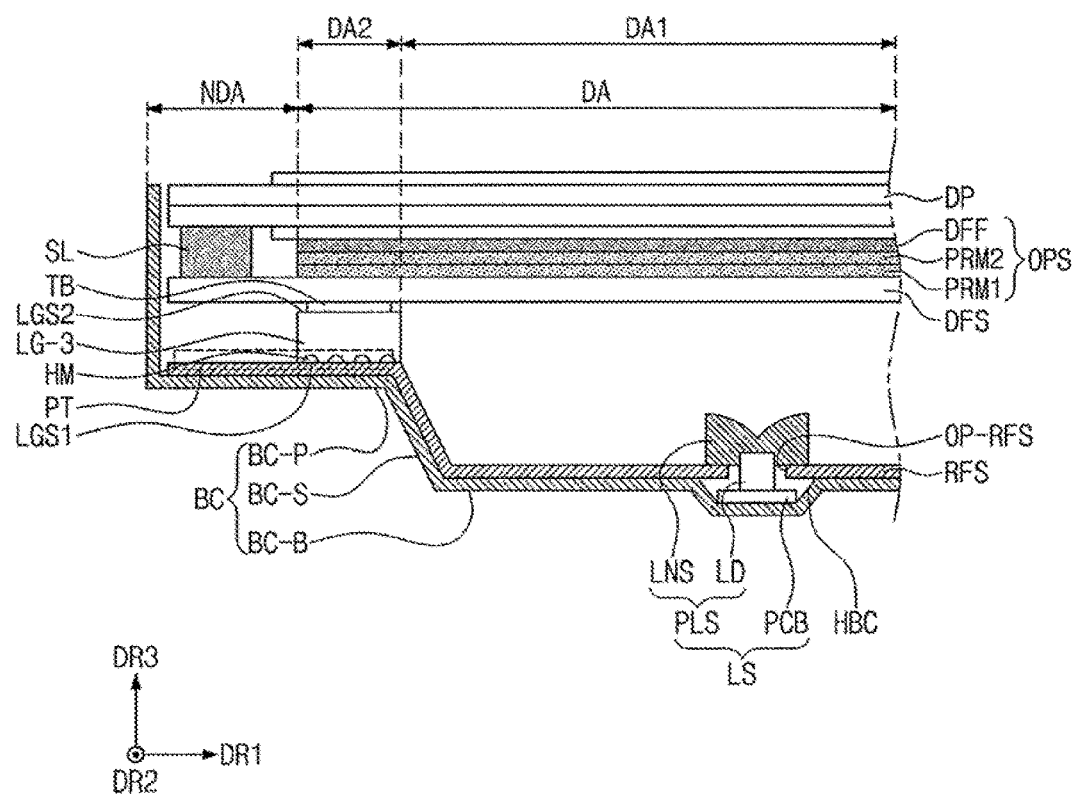
Figure 10:
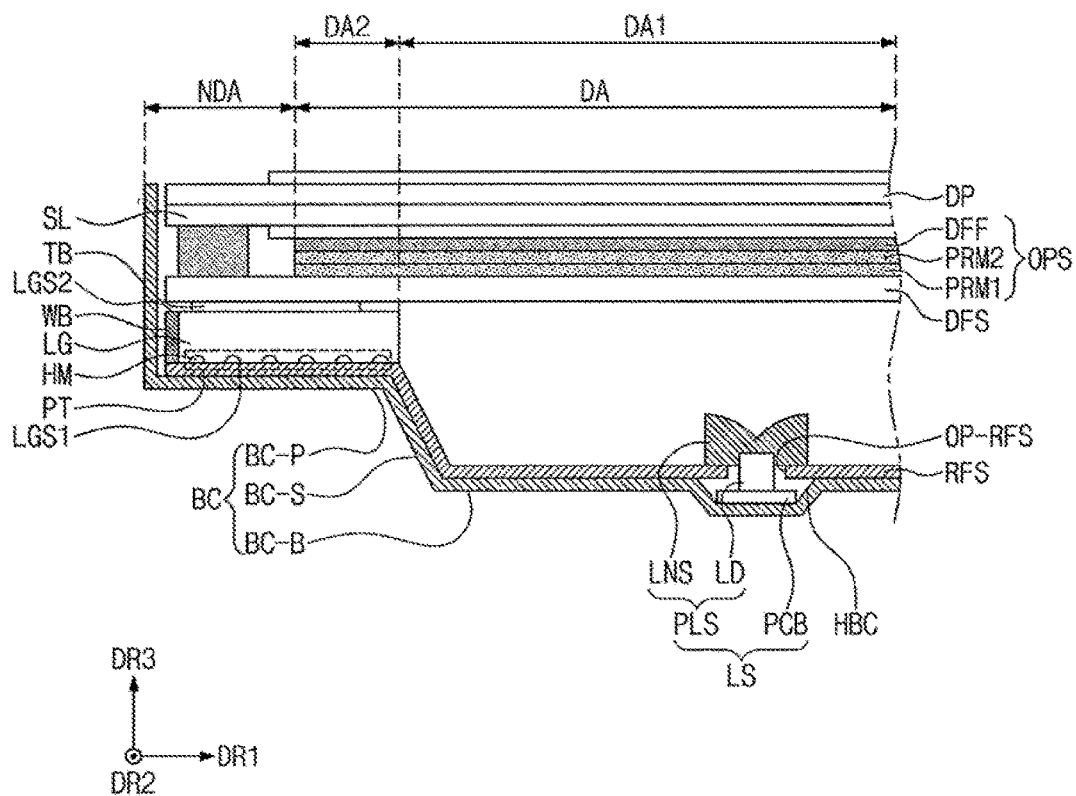

FIGS. 8, 9, and 10 illustrate modified examples at a portion of a cross-section of the display device according to an embodiment, respectively.

Referring to FIG. 8, the display device according to an embodiment includes a light guide member LG-2. The light guide member LG-2 includes an emission pattern PT-1. The emission pattern PT-1 may be disposed adjacent to the second light guide surface LGS2, i.e., on a surface opposite to the one illustrated in FIG. 3. Except for a position at which the emission pattern PT-1 is disposed, description regarding the emission pattern PT-1 and the light guide member LG-2 is substantially the same as the contents described with reference to FIG. 3.

Referring to FIG. 9, the display device according to an embodiment includes a light guide member LG-3. The light guide member LG-3 overlaps only the second display area DA2. Since the light guide member LG-3 does not overlap the non-display area NDA, other components necessary to drive the display device may be disposed in an empty space between the diffusion plate DFS and the reflective member RFS.

Referring to FIG. 10, the display device according to an embodiment may further include a white block WB. The white block WB may be a white color tape disposed on one side surface of the light guide member LG. The white block WB may prevent the light incident into the light guide member LG from leaking to enhance an optical efficiency of the display device.

Figure 11:
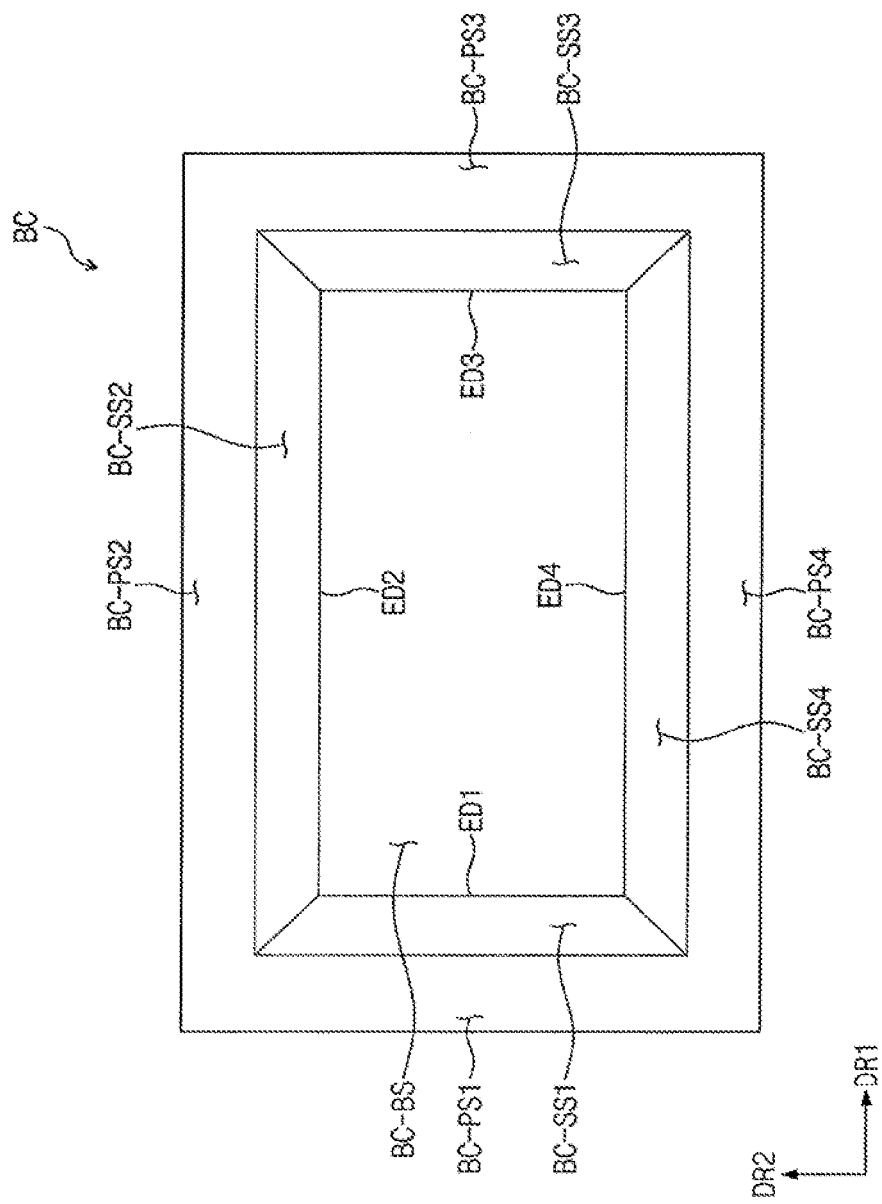
FIG. 11 illustrates a plan view of a bottom member of the display device according to an embodiment when viewed from the top.

FIG. 11 is a plan view of the bottom member BC of the display device DD according to an embodiment when viewed from the top.

Referring to FIGS. 3 and 11, the bottom member BC includes a bottom surface BC-BS, side surfaces BC-SS1, BC-SS2, BC-SS3, and BC-SS4, and support surfaces BC-PS1, BG-PS2, BG-PS3, and BC-PS4. The bottom part BC-B includes the bottom surface BC-BS, the side part BC-S includes the side surfaces BC-SS1, BC-SS2, BC-SS3, and BC-SS4, and the support part BC-P includes the support surface BC-PS1, BC-PS2, BC-PS3, and BC-PS4.

The bottom surface BC-BS faces the display panel DP and include a first edge ED1, a second edge ED2, a third edge ED3, and a fourth edge ED4.

The side surfaces BC-SS1, BC-SS2, BC-SS3, and BC-SS4 extend from the bottom surface BC-BS toward the display panel DP. The side surfaces BC-SS1, BC-SS2, BC-SS3, and BC-SS4 include a first side surface BC-SS1, a second side surface BC-SS2, a third side surface BC-SS3, and a fourth side surface BC-SS4. In detail, the first side surface BC-SS1 extends from the first edge ED1. The second side surface BC-SS2 extends from the second edge ED2. The third side surface BC-SS3 extends from the third edge ED3. The fourth side surface BC-SS4 extends from the fourth edge ED4.

The support surfaces BC-PS1, BC-PS2, BC-PS3, and BC-PS4 extend from the side surfaces BC-SS1, BC-SS2, BC-SS3, and BC-SS4, respectively. The support surfaces BC-PS1, BC-PS2, BC-PS3, and BC-PS4 include a first support surface BC-PS1, a second support surface BC-PS2, a third support surface BC-PS3, and a fourth support surface BC-PS4. In detail, the first support surface BC-PS1 extends from the first side surface BC-SS1. The second support, surface BC-PS2 extends from the second side surface BC-SS2. The third support surface BC-PS3 extends from the third side surface BC-SS3. The fourth support, surface BC-PS4 extends from the fourth side surface BC-SS4.

Figure 12:
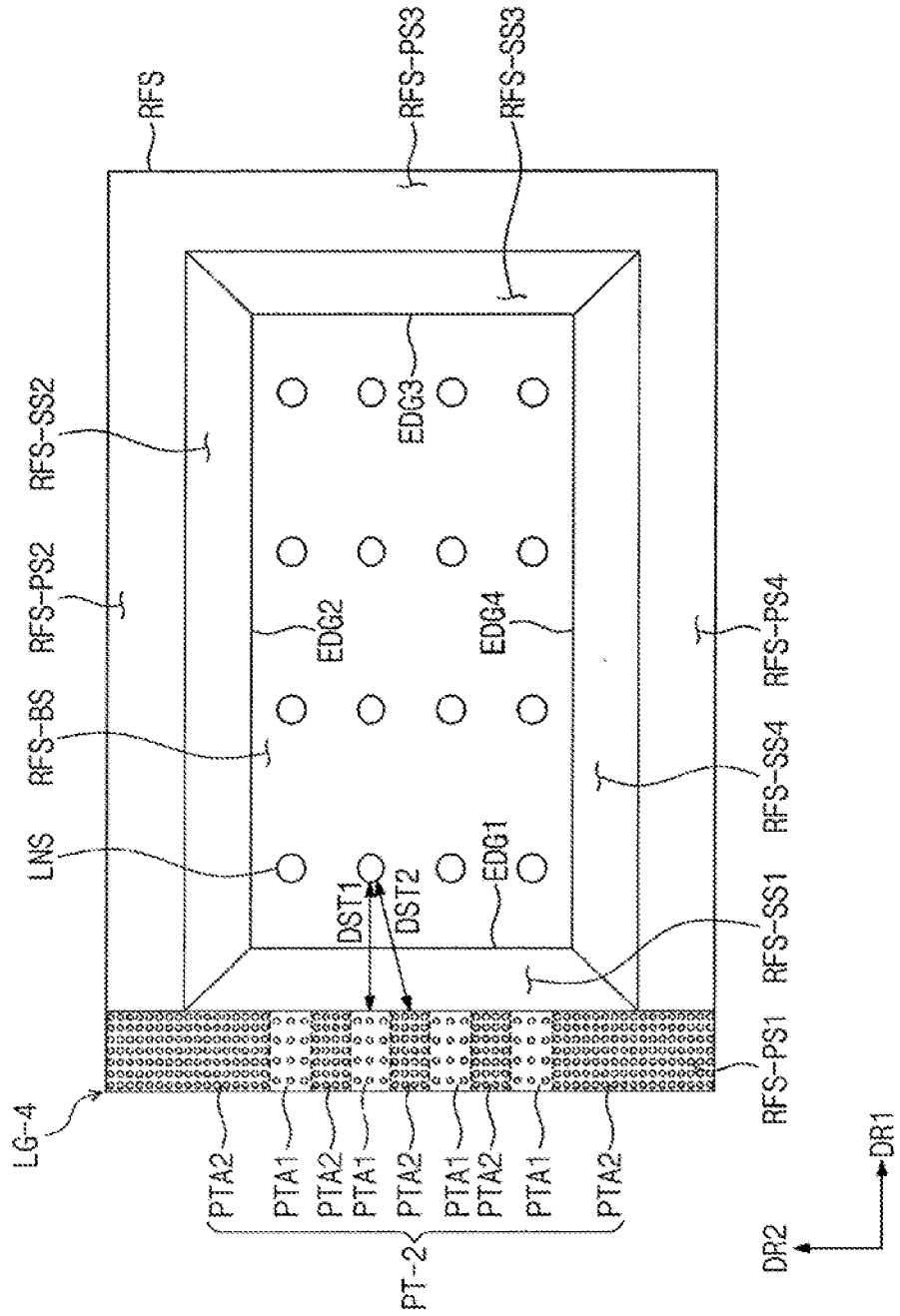
FIG. 12 illustrates a plan view of a reflective member and a light guide member of the display device according to an embodiment when viewed from the top.

FIG. 12 is a plan view of the reflective member RFS and a light guide member LG-4 of the display device DD according to an embodiment when slewed from the top.

Referring to FIGS. 3 and 12, the reflective member RFS incites a bottom-reflective surface RFS-BS, side-reflective surfaces RFS-SS1, RFS-SS2, RFS-SS3, and RFS-SS4, and support-reflective surfaces RFS-PS1, RFS-PS2, RFS-PS3, and RFS-PS4.

The bottom-reflective surface RFS-BS faces the display panel DP and includes a first reflective-edge EDG1, a second reflective-edge EDG2, a third reflective-edge EDG3, and a fourth reflective-edge EDG4. The reflective-edges EDG1 to EDG4 respectively correspond to the edges ED1 to ED4 of the bottom member BC. The bottom-reflective surface RFS-BS overlaps the bottom surface BC-BS of the bottom member BC.

The side-reflective surfaces RFS-SS1, RFS-SS2, RFS-SS3, and RFS-SS4 extend from the bottom-reflective surface RFS-BS toward the display panel DP, The side-reflective surfaces RFS-SS1, RFS-SS2, RFS-SS3, and RFS-SS4 include a first side-reflective surface RFS-SS1, a second side-reflective surface RFS-SS2, a third side-reflective surface RFS-SS3, and a fourth side-reflective surface RFS-SS4. In detail, the first side-reflective surface RFS-SS1 extends from the first reflective-edge EDG1. The second side-reflective surface RFS-SS2 extends from the second reflective-edge EDG2. The third side-reflective surface RFS-SS3 extends from the third reflective-edge EDG3. The fourth side-reflective surface RFS-SS4 extends from the fourth reflective-edge EDG4. The side-reflective surfaces RFS- SS1, RFS-SS2, RFS-SS3, and RFS-SS4 overlap side surfaces BC-SS1, BC-SS2, BC-SS3, and BC-SS4 of the bottom member BC, respectively.

Support-reflective surfaces RFS-PS1, RFS-PS2, RFS-PS3, and RFS-PS4 extend from the side-reflective surfaces RFS-SS1, RFS-SS2, RFS-SS3, and RFS-SS4, respectively. The support-reflective surfaces RFS-PS1, RFS-PS2, RFS-PS3, and RFS-PS4 include a first support-reflective surface RFS-PS1, a second support-reflective surface RFS-PS2, a third support-reflective surface RFS-PS3, and a fourth support-reflective surface RFS-PS4. In detail, the first support-reflective surface RFS-PS1 extends from the first side-reflective surface RFS-SS1. The second support-reflective surface RFS-PS2 extends from the second side-reflective surface RFS-SS2. The third support-reflective surface RFS-PS3 extends from the third side-reflective surface RFS-SS3. The fourth support-reflective surface RFS-PS4 extends from the fourth side-reflective surface RFS-SS4. The support-reflective surfaces RFS-PS1, RFS-PS2, RFS-PS3, and RFS-PS4 overlap support surfaces BC-PS1, BC-PS2, BC-PS3, and BC-PS4 of the bottom member BC, respectively.

The light guide member LG-4 may be disposed a portion of the support-reflective surfaces RFS-PS1, RFS-PS2, RFS-PS3, and RFS-PS4. Although the light guide member LG-4 is exemplarily disposed on the first support-reflective surface RFS-PS1 in FIG. 12, an embodiment is not limited thereto. For example, the light guide member LG-4 may be disposed on the second to fourth support-reflective surfaces RFS-PS2, RFS-PS3, and RFS-PS4.

The light guide member LG-4 includes an emission pattern PT-2. The emission pattern PT-2 may include a first pattern area PTA1 and a second pattern area PTA2. A distance DST1 (hereinafter, referred to as a first distance) between the first pattern area PTA1 and the lens LNS of the light source that is a reference is closer than a distance DST2 (hereinafter, referred to as a second distance) between the second pattern area PTA2 and the lens LNS of the light source that is the reference.

The first pattern area PTA1 includes a plurality of bumps HM arranged with a first density. The second pattern area PTA2 includes a plurality of bumps HM arranged with a second density greater than the first density. For example, the first density is about 1,600 units/cm$^2$ to about 30,000 units/cm$^2$, and the second density is about 30,000 units/cm$^2$ to about 62,500 units/cm$^2$. Since the first distance DST1 is shorter than the second distance DST2, an intensity of light incident into the first pattern area PTA1 is greater than an intensity of light incident into the second pattern area PTA2.

In correspondence with the above, the density of the bumps HM of the first pattern area PTA1 is less than the density of the bumps HM of the second pattern area PTA2. Accordingly, although the intensity of light incident into the first pattern area PTA1 is greater than an intensity of light incident into the second pattern area PTA2, the intensity of light emitted from the first pattern area PTA1 and the intensity of light emitted from the second pattern area PTA2 may be equalized.

Figure 13:
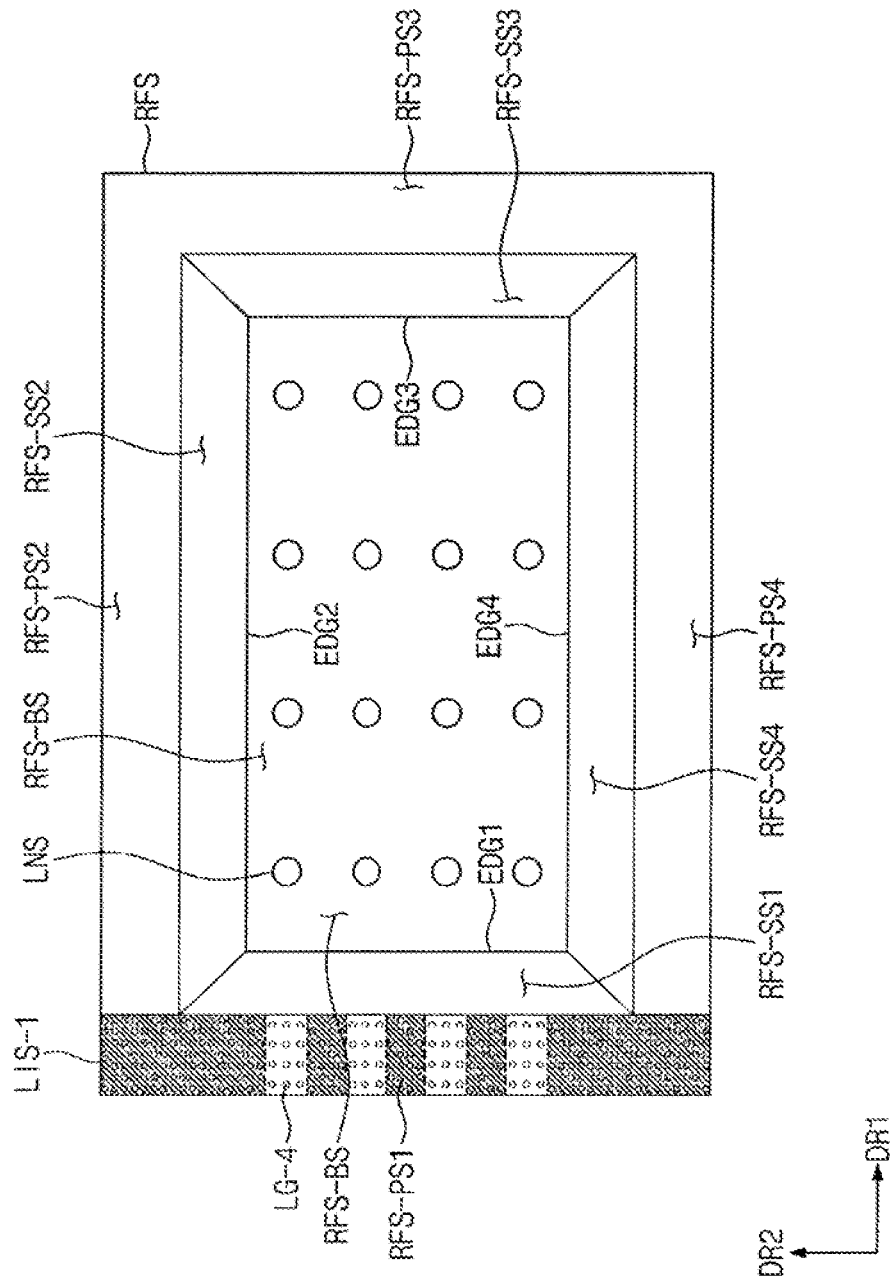
FIG. 13 illustrates a plan view of the reflective member, the light guide member, and a brightness enhancement member of the display device according to an embodiment when viewed from the top.

FIG. 13 is a plan view of the reflective member RFS, the light guide member LG-4, and a brightness enhancement member LIS-1 according to an embodiment when viewed from the top.

Referring to FIGS. 12 and 13, the brightness enhancement member LIS-1 overlaps the second pattern area PTA2 and does not overlap the first pattern area PTA1. Accordingly, the intensity of light emitted from the first pattern area PTA1 and the intensity of light emitted from the second pattern area PTA2 may be equalized. In FIG. 13, although the density of the bumps HM provided in the second pattern area PTA2 is greater than the density of the bumps HM provided in the first pattern area PTA1, an embodiment is not limited thereto. For example, the density of the bumps HM provided in each of the first pattern area PTA1 and the second pattern area PTA2 may be the same as each other.

Figure 14:
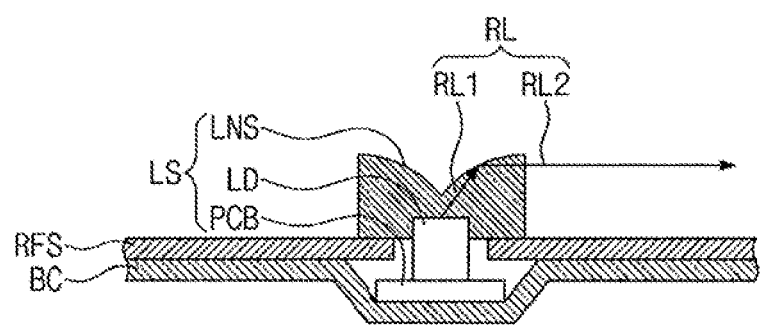
FIG. 14 illustrates a cross-sectional view of a cross-section of a light source of the display device according to an embodiment.

FIG. 14 is a cross-sectional view illustrating a cross-section of the light source LG of the display device according to an embodiment.

Referring to FIG. 14, an LED chip LD receives electrical energy from the printed circuit board PCB and converts the received electrical energy to optical energy to generate the light RL. The LED chip LD provides the generated light RL toward the lens LNS.

The lens LNS includes a lens surface having a curved shape protruding from a center to an outside thereof. That is, the shape of the lens LNS is similar to a shape in which the lens having a cylindrical or half-spherical shape is carved from the upper portion thereof into a cone shape. This expression is only for describing the shape and does not limit the manufacturing method. However, the shape of the lens LNS is not limited thereto. For example, the shape of the lens LNS includes various shapes capable of reflecting the light RL generated from the LED chip LD to the side part BC-S (refer to FIG. 3).

The light RL generated from the LED chip LD may be divided into first light RL1 and second light RL2. The first light RL1 is generated from the LED chip LD and then incident into the lens LNS. The second light RL2 is generated such that the first light RL1 is reflected or totally reflected by the lens LNS. The lens LNS reflects or totally reflects the light RL generated from the LED chip LD, so that the light RL effectively travels toward the light guide member LG (refer to FIG. 3).

Figure 15:
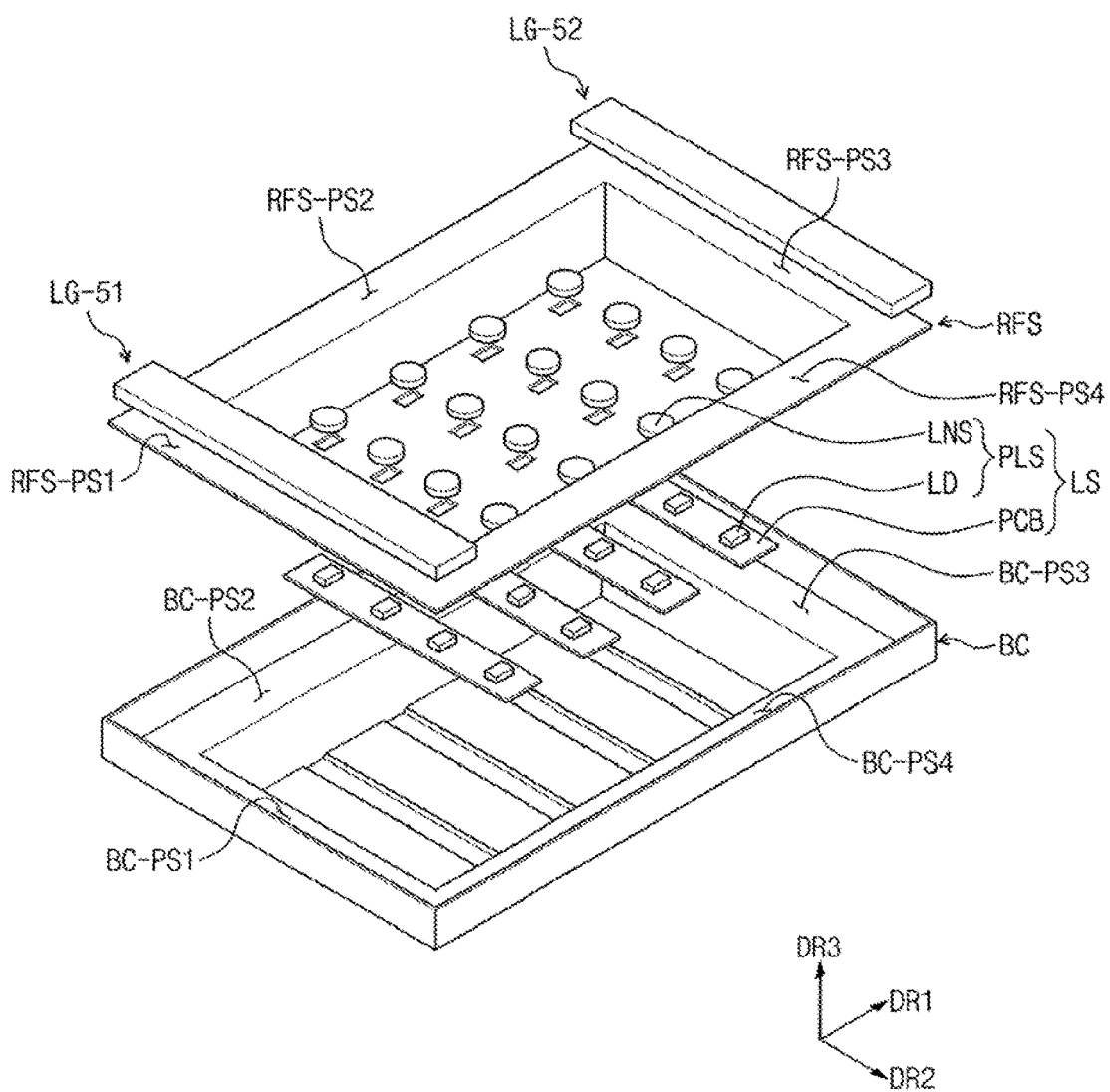
FIGS. 15 and 16 illustrate perspective views of the bottom member, the reflective member, and the light guide member of the display device according to an embodiment respectively.

FIG. 15 is a perspective view illustrating the bottom member BC, the reflective member RFS, and light guide members LG-51 and LG-52 of the display device according to an embodiment. The top cover TC, the display panel DP, the optical member OPS, the diffusion plate DFS, and the like in FIG. 2 are not illustrated for convenience of description.

The light guide members LG-51 and LG-52 may be provided in pair. One LG-51 of the pair of light guide members LG-51 and LG-52 is disposed to overlap the first support surface BC-PS1 and the first support-reflective surface RFS-PS1. The other LG-52 of the pair of light guide members LG-52 and LG-52 is disposed to overlap the third support surface BC-PS3 and the third support-reflective surface RFS-PS3. As illustrated in FIG. 15, the pair of light guide member LG-51 and LG-52 may be respectively disposed on both sides to effectively reduce a bezel size of both sides of the display device.

Figure 16:
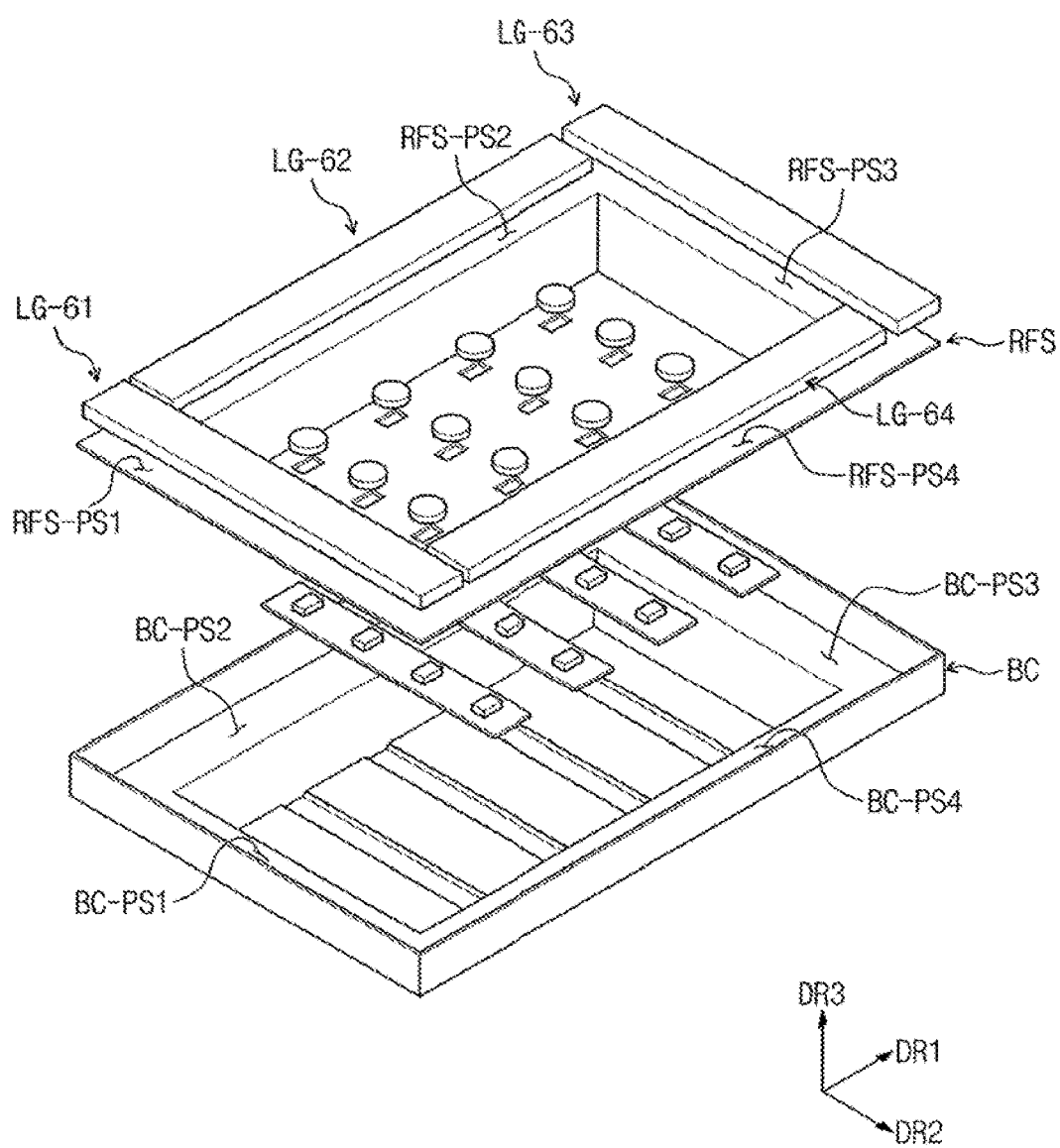

FIG. 16 is a perspective view illustrating the bottom member BC, the reflective member RFS, and light guide members LG-61, LG-62, LG-63, and LG-64 of the display device according to an embodiment. The top cover TC, the display panel DP, the optical member OPS, the diffusion plate DFS, and the like in FIG. 2 are not illustrated for convenience of description.

The light guide members LG-61, LG-62, LG-63, and LG-64 includes a first light guide member LG-61, a second light guide member LG-62, a third light guide member LG-63, and a fourth light guide member LG-64. The first light guide member LG-61 is disposed to overlap the first support surface BC-PS1 and the first support-reflective surface RFS-PS1. The second light guide member LG-62 is disposed to overlap the second support surface BC-PS2 and the second support-reflective surface RFS-PS2. The third light guide member LG-63 is disposed to overlap the third support surface BC-PS3 and the third support-reflective surface RFS-PS3. The fourth light guide member LG-64 is disposed to overlap the fourth support surface BC-PS4 and the fourth support-reflective surface RFS-PS4. As the light guide members LG-61, LG-62, LG-63, and LG-64 are disposed as illustrated in FIG. 16, the bezel size of the edge of the display device may be effectively reduced.

Figure 17:
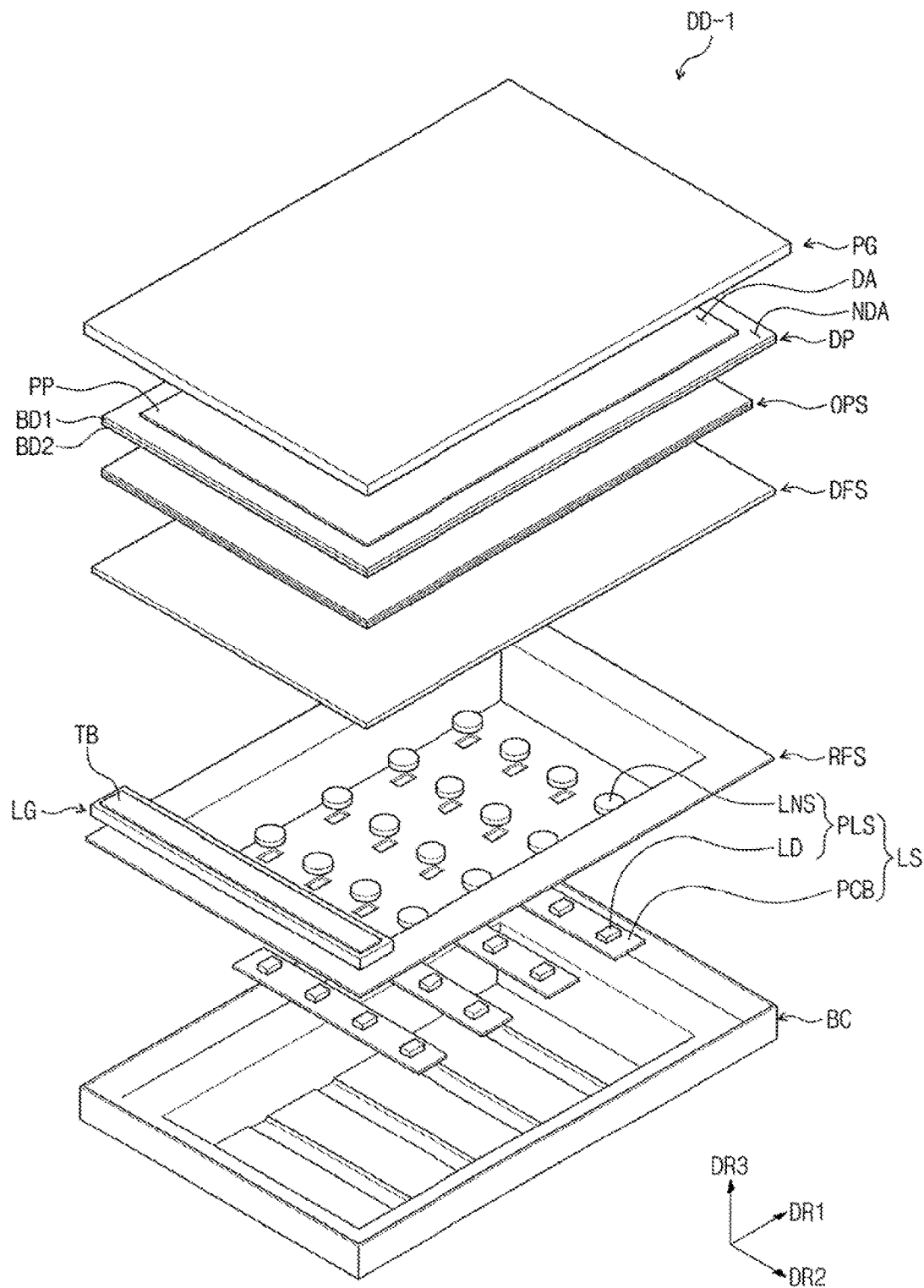
FIG. 17 illustrates an exploded perspective view of a display device according to an embodiment.

FIG. 17 is an exploded perspective view of a display device DD-1 according to an embodiment. The display device DD-1 may include a protection glass PG, a display panel DP, an optical member OPS, a diffusion plate DFS, a light guide member LG, a reflective member RFS, a light source LS, and a bottom member BC.

The protection glass PG is disposed on the display panel DP to protect the display panel DP from external shock or pollutants. The protection glass PG may be coupled to the display panel DP or the bottom member BC through a resin or the like. However, an embodiment is not limited thereto. For example, the protection glass PG may be disposed on the display panel DP in a different method. Also, the protection glass PG may be omitted.

In case that the protection glass PG is disposed on the display panel DP instead of the top cover TC in FIG. 2, a bezel size of the display device DD-1 may be further reduced. Description regarding the display panel DP, the optical member OPS, the diffusion plate DFS, the light guide member LG, the reflective member RFS, the light source LS, and the bottom member BC is substantially the same as the contents described with reference to FIG. 2 and thus omitted.

Figure 18:
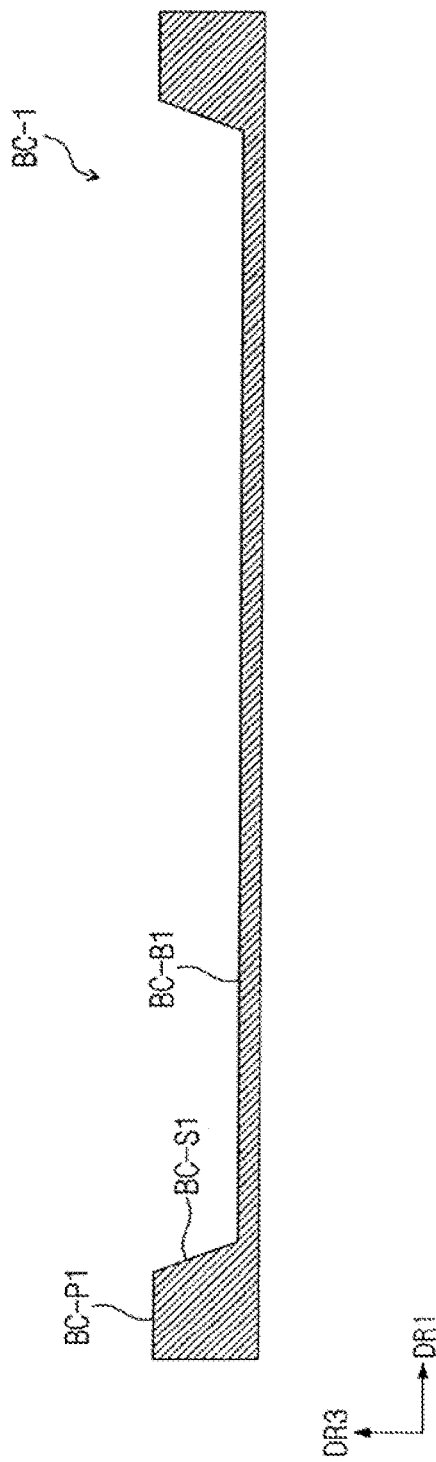
FIGS. 18 and 19 illustrate cross-sections of bottom members according to an embodiment, respectively.
Figure 19:
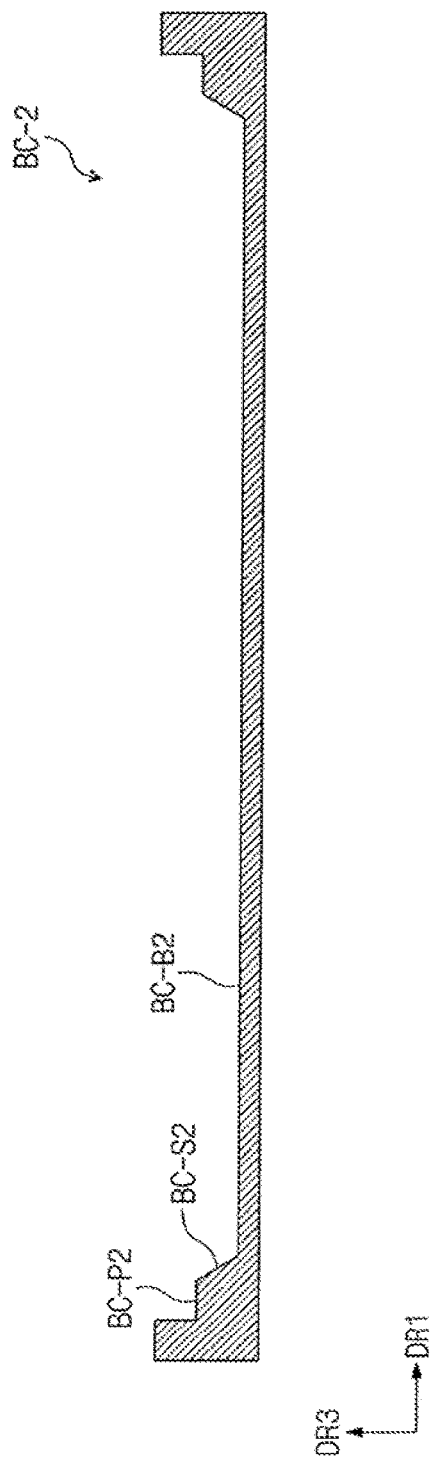

FIGS. 18 and 19 illustrate cross-sections of bottom members BC-1 and BC-2 according to an embodiment, respectively.

Referring to FIG. 18, the bottom member BC-1 has a cross-sectional shape that is different from that of the bottom member BC in FIG. 3. However, the bottom member BC-1 includes a bottom part BC-B1, a side part BC-S1, and a support part BC-P1, and contents regarding each of the bottom part BC-B1, the side part BC-S1, and the support part BC-P1 is the same as that of the bottom part BC-B, the side part BC-S, and the support part BC-P in FIG. 3.

Referring to FIG. 19, the bottom member BC-2 has a cross-sectional shape that is different from that of the bottom member BC in FIG. 3. However, the bottom member BC-2 includes a bottom part BC-B2, a side part BC-S2, and a support part BC-P2, and contents regarding each of the bottom part BC-B2, the side part 8C-S2, and the support part BG-P2 is the same as that of the bottom part BC-B, the side part BC-S, and the support part BC-P in FIG. 3.

Referring to FIGS. 3, 18, and 19, the shape of each of the bottom member BC, BC-1, and BC-2 is not limited while providing the bottom surface BC-BS, the side surfaces BC-SS1, BC-SS2, BC-SS3, and BC-SS4, and the support surface BC-PS1, BC-PS2, BC-PS3, and BC-PS4 of FIG. 11.

According to embodiments, a display device including a bezel having, a slim thickness may be provided. Accordingly, the display device may have an elegant appearance. Also, according to embodiments, the display device including the bezel having the slim thickness may realize a bezel that is substantially not seen.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and or elements described in connection with a particular embodiment may be used singly or in combination in features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
    a display panel including a display area and a non-display area adjacent to the display area;
    a bottom member including a bottom part facing the display area, a side part extending from the bottom part toward the display panel, and a support part extending from the side part to face a portion of the display area and the non-display area;
    a plurality of light sources on the bottom part to emit light; and
    a light guide member between the support part of the bottom member and the display panel to guide the light incident from the plurality of light sources toward the display panel,
    wherein the light guide member overlaps only the support part among all parts of the bottom member.

2. The display device as claimed in claim 1, wherein the light guide member has an area equal to or less than that of the support part on a plane parallel to the display panel.

3. The display device as claimed in claim 1, wherein the light guide member overlaps the portion of the display area and does not overlap the non-display area.

4. The display device as claimed in claim 1, further comprising a diffusion plate on the bottom member to overlap the bottom part, the side part, and the support part.

5. The display device as claimed in claim 4, further comprising a transparent adhesion member between the light guide member and the diffusion plate.

6. The display device as claimed in claim 5, wherein the transparent adhesion member includes an optically clear adhesive (OCA) or an optically clear resin (OCR).

7. The display device as claimed in claim 4, further comprising an optical member on the diffusion plate to overlap the display area.

8. The display device as claimed in claim 7, wherein the optical member includes:
    a first prism member on the diffusion plate to adjust directivity of the incident light in a first direction;
    a second prism member on the first prism member to adjust the directivity of the incident light in a second direction perpendicular to the first direction; and
    a diffuser on the second prism member to diffuse the incident light.

9. The display device as claimed in claim 7, wherein:
    the display area includes a first display area overlapping the bottom part and the side part, and a second display area overlapping the support part, and
    the optical member includes:
        a first diffuser overlapping the second display area, the first diffuser being on the diffusion plate to diffuse the incident light,
        a first prism member overlapping the first display area and the second display area, the first prism member being on the first diffuser to adjust the directivity of the incident light in a first direction,
        a second prism member overlapping the first display area and the second display area, the second prism member being on the first prism member to adjust the directivity of the incident light in a second direction perpendicular to the first direction, and a second diffuser overlapping the first display area, the second diffuser being on the second prism member to diffuse the incident light.

10. The display device as claimed in claim 9, further comprising a brightness enhancement member overlapping the second display area and disposed on the second prism member to enhance brightness of the incident light.

11. The display device as claimed in claim 4, wherein:
the light guide member includes a first light guide surface adjacent to the bottom member and a second light guide surface adjacent to the diffusion plate, and
an incident angle of the incident light with respect to the second light guide surface is equal to or greater than about 42° and less than about 90°.

12. The display device as claimed in claim 1, wherein the light guide member includes an emission pattern to scatter the incident light.

13. The display device as claimed in claim 12, wherein the emission pattern includes:
a first pattern area in which a plurality of bumps are arranged with a first density; and
a second pattern area in which a plurality of bumps are arranged with a second density greater than the first density.

14. The display device as claimed in claim 13, wherein the first density is equal to or greater than about 1,600 units/cm$^2$ and less than about 30,000 units/cm$^2$, and the second density is equal to or greater than about 30,000 units/cm$^2$ and equal to or less than about 62,500 units/cm$^2$.

15. The display device as claimed in claim 13, wherein the first pattern area and the second pattern area are alternately arranged.

16. The display device as claimed in claim 1, wherein each of the plurality of light sources includes:
a LED chip to generate light; and
a lens to cover the LED chip and totally reflect the light toward the side part.

17. The display device as claimed in claim 1, wherein each of the plurality of light sources is spaced at least 50 mm from the side part.

18. The display device as claimed in claim 1, further comprising a plurality of sub-guide members on the light guide member to adjust a directivity of the light,
wherein each of the plurality of sub-guide members has a cross-section gradually increasing in width in a direction that is oriented away from the light guide member.

19. The display device as claimed in claim 1, wherein:
the bottom part includes:
a first edge,
a second edge extending from the first edge in a direction perpendicular to the first edge,
a third edge extending from the second edge and parallel to the first edge, and
a fourth edge extending from the third edge and parallel to the second edge, the side part includes:
a first side surface extending from the first edge,
a second side surface extending from the second edge,
a third side surface extending from the third edge, and
a fourth side surface extending from the fourth edge, and the support part includes:
a first support surface extending from the first side surface,
a second support surface extending from the second side surface,
a third support surface extending from the third side surface, and
a fourth support surface extending from the fourth side surface.

20. The display device as claimed in claim 19, wherein the light guide member overlaps the first support surface.

21. The display device as claimed in claim 19, wherein the light guide member is provided in pair, one of the pair of the light guide members overlapping the first support surface and another of the pair of the light guide members overlapping the third support surface.

22. The display device as claimed in claim 19, wherein the light guide member includes:
a first light guide member on the first support surface;
a second light guide member on the second support surface;
a third light guide member on the third support surface; and
a fourth light guide member on the fourth support surface.

23. The display device as claimed in claim 1, further comprising a reflective member contacting the bottom member.

24. The display device as claimed in claim 1, further comprising a white block on one side surface of the light guide member to prevent the light incident into the light guide member from leaking.

25. The display device as claimed in claim 1, wherein the support part of the bottom member has a non-overlapping relationship with a center of the display area.

26. The display device as claimed in claim 1, further comprising a diffusion plate on the bottom member, the diffusion plate overlapping a top surface of the light guide member and a bottom surface of the display panel.

27. The display device as claimed in claim 1, wherein the light guide member has a non-overlapping relationship with the bottom and side parts of the bottom member.

28. The display device as claimed in claim 1, wherein the light guide member includes a plurality of bumps on the support part.

29. A display device, comprising:
a display panel including a display area and a non-display area adjacent to the display area;
a bottom member including a bottom surface facing the display panel, a side surface extending toward the display panel, and a support surface extending from the side surface;
a plurality of light sources on the bottom surface to emit light; and
a light guide member overlapping the support surface and receiving light to guide the light toward the display panel, the light guide member having an area less than that of the support surface.

30. The display device as claimed in claim 29, wherein the light guide member overlaps the support surface.

31. The display device as claimed in claim 29, further comprising a diffusion plate on the bottom member.

32. The display device as claimed in claim 31, further comprising an optically clear adhesive (OCA) between the light guide member and the diffusion plate.

33. The display device as claimed in claim 31, further comprising:
a first prism member on the diffusion plate to adjust directivity of the incident light in a first direction;
a second prism member on the first prism member to adjust the directivity of the incident light in a second direction perpendicular to the first direction; and a diffuser on the second prism member to diffuse the incident light.

34. The display device as claimed in claim 31, wherein:
the display area includes a first display area overlapping the bottom surface and the side surface, and a second display area overlapping the support surface, and
the display device further comprises:
a first diffuser overlapping the second display area and being on the diffusion plate to diffuse the incident light,
a first prism member overlapping the first display area and the second display area and being on the first diffuser to adjust directivity of the incident light in a first direction,
a second prism member overlapping the first display area and the second display area and being on the first prism member to adjust the directivity of the incident light in a second direction perpendicular to the first direction, and
a second diffuser overlapping the first display area and being on the second prism member to diffuse the incident light.

35. The display device as claimed in claim 34, further comprising a brightness enhancement member overlapping the second display area and being on the second prism member to enhance brightness of the incident light.

36. A display device, comprising:
a display panel including a display area having a central display area and an edge display area adjacent to the central display area, the edge display area being between the central display area and a non-display area;
a plurality of light sources overlapping the central display area and being below the display panel to emit light;
a light guide member overlapping the edge display area, non-overlapping the central display area, and being below the display panel to guide the light incident from the plurality of light sources toward the display panel; and
a bottom member below the plurality of light sources, the bottom member including:
a bottom surface overlapping the central display area,
a side surface extending from the bottom surface toward the display panel to overlap the central display area, and
a support surface extending from the side surface to overlap the edge display area and the non-display area,
wherein the light guide member is on the support surface, and
wherein the light guide member has a non-overlapping relationship with the bottom and side surfaces of the bottom member.

37. The display device as claimed in claim 36, wherein the edge display area has an area less than that of the central display area.

38. The display device as claimed in claim 36, wherein each of the plurality of light sources includes:
a LED chip to generate light; and
a lens to cover the LED chip and totally reflect the light toward the light guide member.

39. The display device as claimed in claim 36, wherein the light guide member includes an emission pattern to diffuse the incident light.

40. The display device as claimed in claim 36, wherein the light guide member has an area equal to or less than that of the support surface on a plane parallel to the display panel.

* * * * *